United States Patent
Kikuchi

(10) Patent No.: US 9,237,321 B2
(45) Date of Patent: Jan. 12, 2016

(54) IMAGE PROCESSING DEVICE TO GENERATE AN INTERPOLATED IMAGE THAT INCLUDES A LARGE AMOUNT OF HIGH-FREQUENCY COMPONENT AND HAS HIGH RESOLUTION, IMAGING DEVICE, IMAGE PROCESSING METHOD, AND INFORMATION STORAGE DEVICE

(71) Applicant: OLYMPUS CORPORATION, Shibuya-ku, Tokyo (JP)

(72) Inventor: Sunao Kikuchi, Akiruno (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/541,608

(22) Filed: Nov. 14, 2014

(65) Prior Publication Data
US 2015/0070533 A1 Mar. 12, 2015

Related U.S. Application Data

(63) Continuation of application No. PCT/JP2013/084189, filed on Dec. 20, 2013.

(30) Foreign Application Priority Data

Jan. 28, 2013 (JP) .................................. 2013-012817

(51) Int. Cl.
*H04N 3/14* (2006.01)
*H04N 5/335* (2011.01)
(Continued)

(52) U.S. Cl.
CPC ................. *H04N 9/76* (2013.01); *H04N 9/045* (2013.01); *H04N 9/07* (2013.01); *H04N 7/0135* (2013.01); *H04N 2209/045* (2013.01); *H04N 2209/046* (2013.01)

(58) Field of Classification Search
CPC ................... H04N 2209/045; H04N 2209/046
USPC .................................... 348/272, 273, 294–308
See application file for complete search history.

(56) References Cited

U.S. PATENT DOCUMENTS 8,363,123 B2 * 1/2013 Inaba et al. ................. 348/222.1
2006/0038891 A1 * 2/2006 Okutomi et al. ........... 348/222.1
(Continued)

FOREIGN PATENT DOCUMENTS

JP 2003087806 A 3/2003
JP 2005175590 A 6/2005
(Continued)

OTHER PUBLICATIONS

International Search Report (ISR) and Written Opinion dated Mar. 4, 2014 issued in International Application No. PCT/JP2013/084189.

*Primary Examiner* — Sinh Tran
*Assistant Examiner* — Selam Gebriel
(74) *Attorney, Agent, or Firm* — Holtz, Holtz, Goodman & Chick PC

(57) ABSTRACT

An image processing device includes: an image acquisition section that acquires captured image data captured using an image sensor including color filters corresponding to bands, and corresponding to a plurality of frames; an alignment processing section that performs an alignment process on the captured image data to generate integrated captured image data; a reference band selection section that selects a reference band from the bands using an output image in a preceding frame; a reference image generation section that performs an interpolation process on image data included in the integrated captured image data and corresponding to the color filter corresponding to the reference band; and an interpolated image generation section that performs an interpolation process on image data included in the integrated captured image data and corresponding to the color filter corresponding to a band differing from the reference band based on a reference image to generate an interpolated image.

15 Claims, 15 Drawing Sheets

(51) Int. Cl.
*H04N 9/76* (2006.01)
*H04N 9/07* (2006.01)
*H04N 9/04* (2006.01)
*H04N 7/01* (2006.01)

(56) References Cited

U.S. PATENT DOCUMENTS

2006/0222269 A1 10/2006 Ohno
2009/0091646 A1 4/2009 Manabe
2009/0274380 A1* 11/2009 Wedi .............................. 382/233
2010/0272184 A1* 10/2010 Fishbain et al. .......... 375/240.16
2011/0279712 A1* 11/2011 Hayashi ........................ 348/239
2012/0229677 A1 9/2012 Ugawa et al.

FOREIGN PATENT DOCUMENTS

| JP | 2009094577 A | 4/2009 |
| JP | 2010028374 A | 2/2010 |
| WO | 2012008143 A1 | 1/2012 |

* cited by examiner

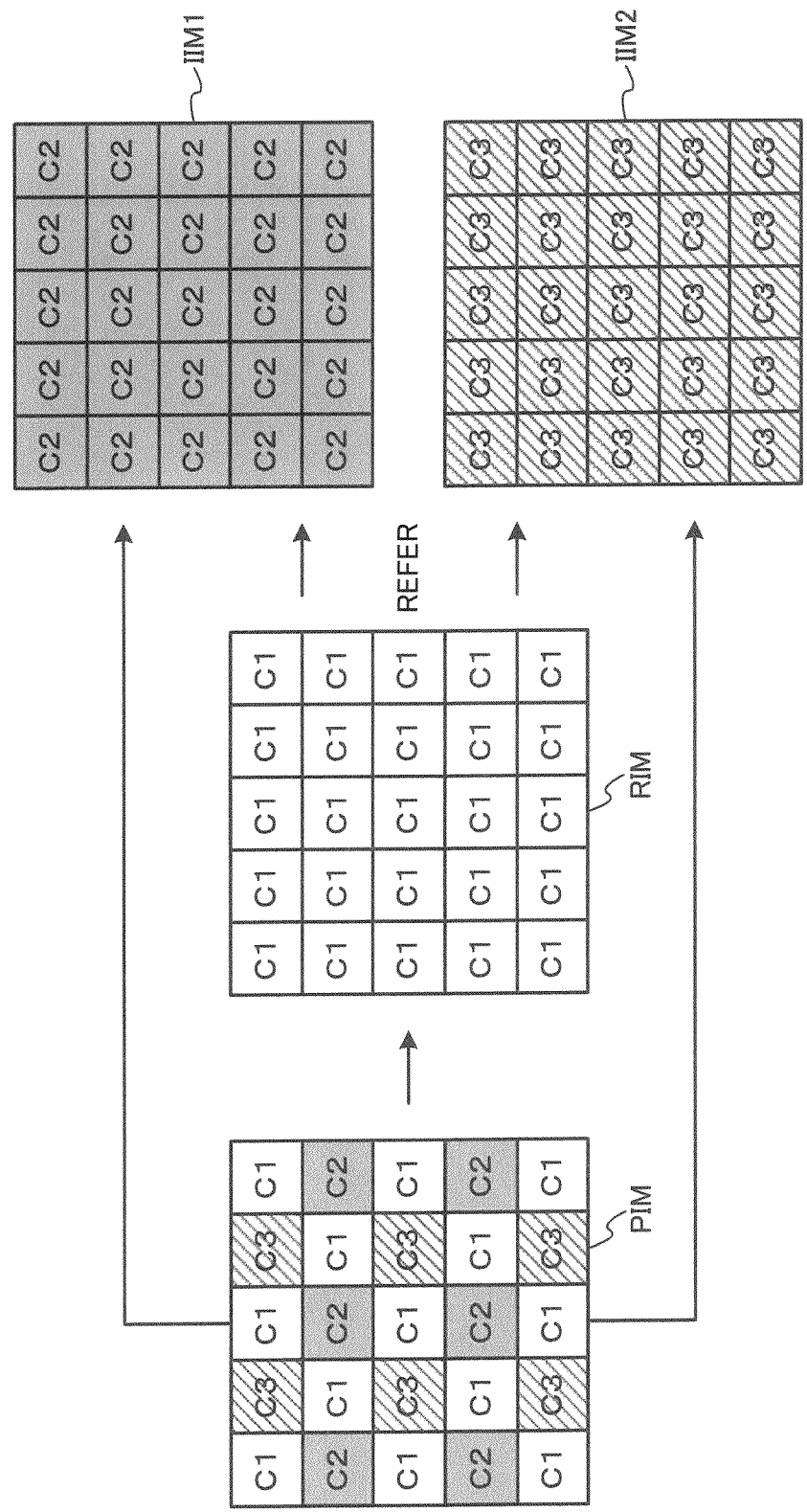

IMAGE PROCESSING DEVICE TO GENERATE AN INTERPOLATED IMAGE THAT INCLUDES A LARGE AMOUNT OF HIGH-FREQUENCY COMPONENT AND HAS HIGH RESOLUTION, IMAGING DEVICE, IMAGE PROCESSING METHOD, AND INFORMATION STORAGE DEVICE

CROSS REFERENCE TO RELATED APPLICATION

This application is a continuation of International Patent Application No. PCT/JP2013/084189, having an international filing date of Dec. 20, 2013, which designated the United States, the entirety of which is incorporated herein by reference. Japanese Patent Application No. 2013-012817 filed on Jan. 28, 2013 is also incorporated herein by reference in its entirety.

BACKGROUND

The present invention relates to an image processing device, an imaging device, an image processing method, an information storage device, and the like.

An imaging device has been known in which an R (red)-band color filter, a G (green)-band color filter, and a B (blue)-band color filter are provided on the front side of an image sensor in order to capture a full-color image. It is effective for an imaging device that includes a single-chip image sensor to generate an interpolated image referring to information about a band that makes it possible to accurately acquire a high-frequency component in order to generate an interpolated image that includes a large amount of high-frequency component and has high resolution.

A band that makes it possible to acquire a high-frequency component must be placed with high sampling density, and have a high correlation with the color characteristics of the object. JP-A-2009-94577 discloses a technique that switches the band referred to when generating the interpolated image corresponding to the color characteristics of the object.

A multiband imaging technique has attracted attention as a means for accurately reproducing the color of the object. A multiband imaging device may capture a plurality of images, or utilize a plurality of cameras. For example, JP-A-2003-87806 discloses a technique that utilizes a single-chip multi-band image sensor that is provided with color filters corresponding to four or more bands.

SUMMARY

According to one aspect of the invention, there is provided an image processing device comprising:

an image acquisition section that acquires captured image data that has been captured using an image sensor and corresponds to a plurality of frames that differ in capture time, the image sensor including a color filter array in which a plurality of color filters that respectively correspond to a plurality of bands are placed in an array;

an alignment processing section that performs an alignment process on the acquired captured image data that corresponds to the plurality of frames to generate integrated captured image data;

a reference band selection section that selects a reference band for generating a reference image from the plurality of bands using an output image in a preceding frame that precedes a reference frame in which the output image is generated;

a reference image generation section that performs an interpolation process on image data that is included in the integrated captured image data and corresponds to a color filter among the plurality of color filters that corresponds to the reference band to generate the reference image; and an interpolated image generation section that performs an interpolation process on image data that is included in the integrated captured image data and corresponds to a color filter among the plurality of color filters that corresponds to a band among the plurality of bands that differs from the reference band based on the reference image to generate an interpolated image.

According to another aspect of the invention, there is provided an image processing method comprising:

acquiring captured image data that has been captured using an image sensor and corresponds to a plurality of frames that differ in capture time, the image sensor including a color filter array in which a plurality of color filters that respectively correspond to a plurality of bands are placed in an array;

performing an alignment process on the acquired captured image data that corresponds to the plurality of frames to generate integrated captured image data;

selecting a reference band for generating a reference image from the plurality of bands using an output image in a preceding frame that precedes a reference frame in which the output image is generated;

performing an interpolation process on image data that is included in the integrated captured image data and corresponds to a color filter among the plurality of color filters that corresponds to the reference band to generate the reference image; and performing an interpolation process on image data that is included in the integrated captured image data and corresponds to a color filter among the plurality of color filters that corresponds to a band among the plurality of bands that differs from the reference band based on the reference image to generate an interpolated image.

According to another aspect of the invention, there is provided a computer-readable storage device with an executable program stored thereon, wherein the program instructs a computer to perform steps of:

acquiring captured image data that has been captured using an image sensor and corresponds to a plurality of frames that differ in capture time, the image sensor including a color filter array in which a plurality of color filters that respectively correspond to a plurality of bands are placed in an array;

performing an alignment process on the acquired captured image data that corresponds to the plurality of frames to generate integrated captured image data;

selecting a reference band for generating a reference image from the plurality of bands using an output image in a preceding frame that precedes a reference frame in which the output image is generated;

performing an interpolation process on image data that is included in the integrated captured image data and corresponds to a color filter among the plurality of color filters that corresponds to the reference band to generate the reference image; and performing an interpolation process on image data that is included in the integrated captured image data and corresponds to a color filter among the plurality of color filters that corresponds to a band among the plurality of bands that differs from the reference band based on the reference image to generate an interpolated image.

BRIEF DESCRIPTION OF THE DRAWINGS

FIG. 1 is a view illustrating an interpolation process.

FIGS. 2A to 2H are views illustrating a technique that capture a plurality of images.

FIG. 6 illustrates an example of a color filter array.

DESCRIPTION OF EXEMPLARY EMBODIMENTS

Figure 3:
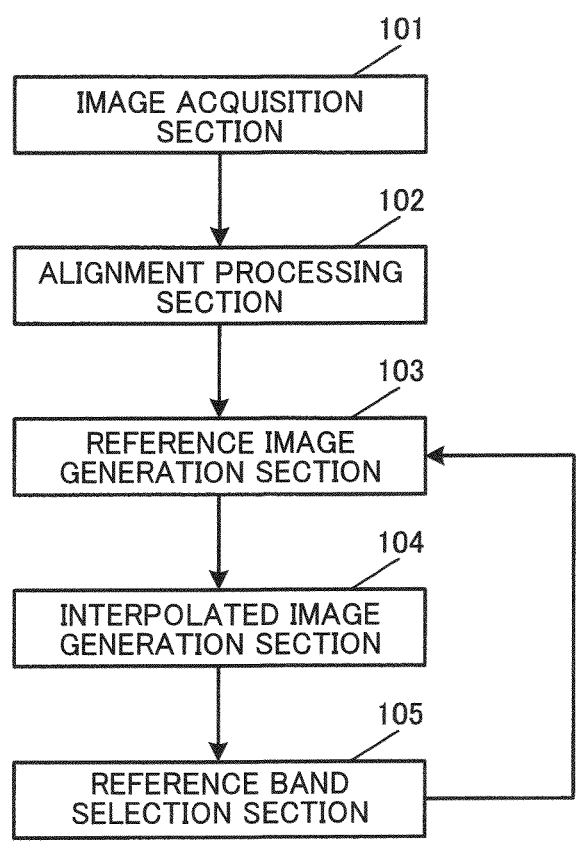
FIG. 3 illustrates a system configuration example of an image processing device according to a first embodiment.

Several exemplary embodiments of the invention may provide an image processing device, an imaging device, an image processing method, an information storage device, and the like that can generate an interpolated image that includes a large amount of high-frequency component and has high resolution regardless of the color characteristics of the object while maintaining the frame rate.

According to one embodiment of the invention, the reference band for generating the reference image is selected from the plurality of bands using the output image in the preceding frame that precedes the reference frame in which the output image is generated. The alignment process is performed on the acquired captured image data that corresponds to the plurality of frames to generate the integrated captured image data. The interpolation process is performed on the image data that is included in the integrated captured image data, and corresponds to the color filter that corresponds to the reference band to generate the reference image. The interpolation process is performed on the image data that is included in the integrated captured image data, and corresponds to the color filter that corresponds to a band that differs from the reference band, based on the reference image to generate the interpolated image.

This makes it possible to use a band having low sampling density as information having high sampling density while maintaining the frame rate, and generate an image that includes a large amount of high-frequency component and has high resolution regardless of the color characteristics of the object.

The image processing device may further comprise:

an available frame count determination section that determines a reference image generation frame count that is used by the reference image generation section based on a type of the reference band selected by the reference band selection section.

This makes it possible to read frames in a number necessary for generating the reference image corresponding to the type of the reference band.

In the image processing device, the image acquisition section may acquire the captured image data that has been captured using the image sensor and corresponds to the plurality of frames, the image sensor including the color filter array that includes a first color filter, and a second color filter that has a sampling density lower than that of the first color filter, and the available frame count determination section may determine a first frame count to be the reference image generation frame count when the reference band is a band that corresponds to the first color filter, and may determine a second frame count that is larger than the first frame count to be the reference image generation frame count when the reference band is a band that corresponds to the second color filter.

This makes it possible to determine the reference image generation frame count corresponding to the sampling density of the reference band, for example.

In the image processing device, the first color filter may be a color filter that is placed in the color filter array at intersections of an odd-numbered row and an odd-numbered column and intersections of an even-numbered row and an even-numbered column, or intersections of an odd-numbered row and an even-numbered column and intersections of an even-numbered row and an odd-numbered column, and the second color filter may be a color filter that is placed in the color filter array at positions differing from those of the first color filter.

According to this configuration, it is possible to generate a highly accurate reference image using only the data corresponding to one frame when the reference band is a band that is placed in a staggered pattern, and generate a highly accurate reference image using the data corresponding to a plurality of frames when the reference band is a band that is not placed in a staggered pattern, for example.

The image processing device may further comprise:

an available frame count determination section that determines an interpolated image generation frame count that is used by the interpolated image generation section based on a type of the reference band selected by the reference band selection section.

This makes it possible to read frames in a number necessary for generating the interpolated image corresponding to the type of the reference band.

In the image processing device, the image acquisition section may acquire the captured image data that has been captured using the image sensor and corresponds to the plurality of frames, the image sensor including the color filter array that includes a first color filter, and a second color filter that has a sampling density lower than that of the first color filter, and the available frame count determination section may determine a third frame count to be the interpolated image generation frame count when the reference band is a band that corresponds to the first color filter, and may determine a fourth frame count that is smaller than the third frame count to be the interpolated image generation frame count when the reference band is a band that corresponds to the second color filter.

This makes it possible to determine the interpolated image generation frame count corresponding to the sampling density of the reference band, for example.

The image processing device may further comprise:

a frame correlation determination section that determines an inter-frame correlation of the captured image data, the available frame count determination section may determine an available frame count based on a determination result of the frame correlation determination section.

This makes it possible to suppress occurrence of an artifact due to a decrease in accuracy of the alignment process even when a significant change in scene has occurred, and a plurality of frames do not have a correlation, for example.

In the image processing device, the reference band selection section may select a band among the plurality of bands that has a highest correlation with color characteristics of an object in the output image in the preceding frame as the reference band.

This makes it possible to perform the interpolated image generation process and the like based on the color characteristics of the object, for example.

In the image processing device, the reference band selection section may select the reference band by evaluating at least one of a high-frequency component and brightness of the output image in the preceding frame.

This makes it possible to determine the reference band with high accuracy, for example.

In the image processing device, the reference band selection section may select the reference band on a basis of local areas, the local areas being defined by dividing an image into a plurality of areas.

It is possible to generate an interpolated image that includes a large amount of high-frequency component and has high resolution, even when a plurality of objects that differ in color characteristics are present within one scene, by utilizing a different reference band on a local area basis, for example.

In the image processing device, the image acquisition section may acquire the captured image data that has been captured using the image sensor and corresponds to the plurality of frames, the image sensor including the color filter array that includes a first color filter, and a second color filter that has a sampling density lower than that of the first color filter, the first color filter being placed at intersections of an odd-numbered row and an odd-numbered column and intersections of an even-numbered row and an even-numbered column, or intersections of an odd-numbered row and an even-numbered column and intersections of an even-numbered row and an odd-numbered column, and the second color filter being placed at positions differing from those of the first color filter, and the reference image generation section may generate the reference image by performing the interpolation process on image data that corresponds to the first color filter when the reference band has not been selected by the reference band selection section.

According to this configuration, it is possible to generate a highly accurate interpolated image by utilizing the band having the highest sampling density as the reference band as compared with the case of utilizing another band as the reference band, for example.

In the image processing device, the image acquisition section may acquire the captured image data that has been captured using the image sensor and corresponds to the plurality of frames, the image sensor including the color filter array in which a plurality of color filters respectively corresponding to four or more bands that differ in spectral sensitivity characteristics are placed.

This makes it possible to generate an image that includes a large amount of high-frequency component and has high resolution regardless of the color characteristics of the object, even when generating the interpolated image using a multi-band image sensor, for example.

According to another embodiment of the invention, there is provided an imaging device comprising the image processing device.

A first embodiment and a second embodiment of the invention are described below. The background of each embodiment will be described first. A system configuration example, the details of a process, and a modification according to each embodiment will then be described. A method according to the first embodiment and a method according to the second embodiment will be described thereafter. Note that the following embodiments do not in any way limit the scope of the invention laid out in the claims. Note also that all of the elements described below in connection with the following embodiments should not necessarily be taken as essential elements of the invention.

1. Outline

An imaging device has been known in which an R (red)-band color filter, a G (green)-band color filter, and a B (blue)-band color filter are provided on the front side of an image sensor in order to capture a full-color image. It is effective for an imaging device that includes a single-chip image sensor to generate an interpolated image referring to information about a band that makes it possible to accurately acquire a high-frequency component in order to generate an interpolated image that includes a large amount of high-frequency component and has high resolution (see FIG. 1).

According to the method illustrated in FIG. 1, a C1 band is selected as a reference band from a captured image PIM that has been captured using color filters corresponding to three bands (C1 to C3 bands), and a C1-band interpolation process is performed on the captured image PIM to generate a reference image RIM. A C2-band interpolation process and a C3-band interpolation process are performed based on the reference image RIM to generate a C2-band interpolated image IIM1 and a C3-band interpolated image IIM2.

A band that makes it possible to acquire a high-frequency component must be placed with high sampling density, and have a high correlation with the color characteristics of the object.

JP-A-2009-94577 discloses a technique that switches the band referred to when generating the interpolated image corresponding to the color characteristics of the object.

However, the technique disclosed in JP-A-2009-94577 cannot increase the sampling density of the band used as the reference band. If a band that has a high correlation with the color characteristics of the object, but has low sampling density is used as the reference band when a band having high sampling density has low correlation with the color characteristics of the object, for example, it is difficult to reproduce the high-frequency component. Specifically, if the R band or the B band of an RGB Bayer array that has a sampling density lower than that of the G band is used as the reference band, it is difficult to accurately reproduce the high-frequency component as compared with the case of using the G band as the reference band.

A multiband imaging technique has attracted attention as a means for accurately reproducing the color of the object. A multiband imaging device may capture a plurality of images, or utilize a plurality of cameras. For example, JP-A-2003-87806 discloses a technique that utilizes a single-chip multiband image sensor that is provided with color filters corresponding to four or more bands. According to the technique disclosed in JP-A-2003-87806, it is possible to acquire a multiband image by capturing one image using a multiband image sensor (see FIG. 6), for example. The technique disclosed in JP-A-2003-87806 has advantages in that the size of the device can be reduced, and the frame rate can be maintained, for example. In order to generate an interpolated image that includes a large amount of high-frequency component and has high resolution using such a multiband image sensor, it is effective to generate an interpolated image using information about a band that makes it possible to accurately acquire a high-frequency component as a reference image.

However, when using a multiband image sensor (see FIG. 6) in which the sampling density of each band decreases as compared with a 3-band image sensor, it is difficult to reproduce the high-frequency component when a band selected as the reference band due to a high correlation with the color characteristics of the object has low sampling density. This problem is inevitable as the number of bands of a multiband image sensor increases.

Figures 2A, 2B, 2C, 2D, 2E, 2F, 2G, 2H:
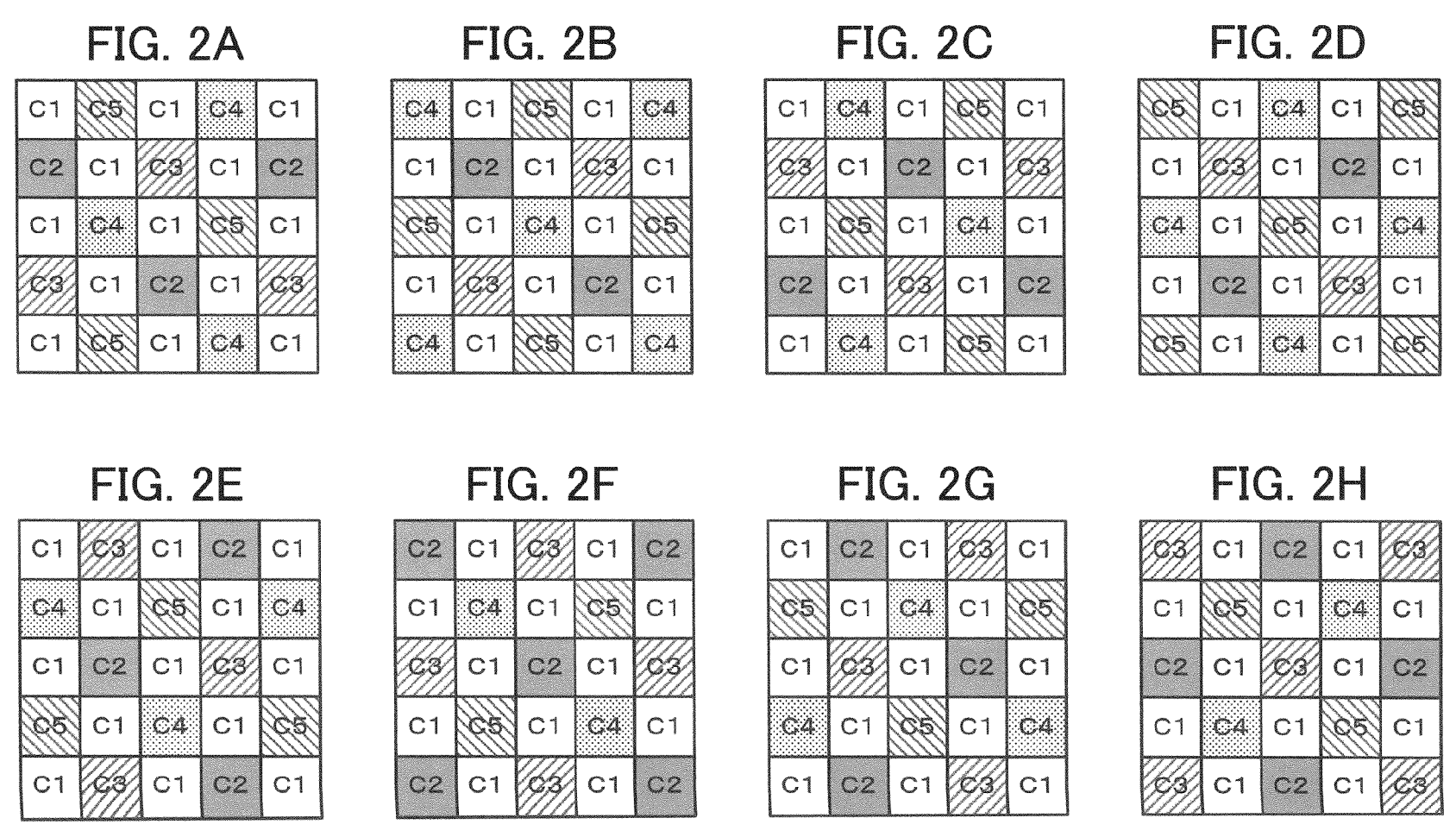

A technique that captures a plurality of images to increase the apparent pixel density can generate an image that includes a large amount of high-frequency component and has high resolution regardless of the color characteristics of the object, but has drawbacks in that the process becomes complex, a large memory capacity is required, and a decrease in frame rate occurs. For example, it is necessary to capture eight images (see FIGS. 2A to 2H) in order to obtain information about each band at each pixel position using the multiband image sensor illustrated in FIG. 6 without performing an interpolation process. Specifically, it is necessary to capture a larger number of images as compared with the case of performing an interpolation process in order to increase the apparent pixel density without performing an interpolation process.

In view of the above problems, an image processing device and the like according to the first embodiment and the second embodiment make it possible to generate an interpolated image that includes a large amount of high-frequency component and has high resolution regardless of the color characteristics of the object while maintaining the frame rate using a single-chip image sensor having spectral sensitivity characteristics obtained by three or more bands.

2. First Embodiment

The first embodiment illustrates an example in which a band (reference band) used to generate a reference image is selected from an output image in a preceding frame, and RAW data corresponding to two frames is used to generate an interpolated image.

2.1 System Configuration Example

FIG. 3 illustrates a configuration example of the image processing device according to the first embodiment. The image processing device includes an image acquisition section 101, an alignment processing section 102, a reference image generation section 103, an interpolated image generation section 104, and a reference band selection section 105.

The connection relationship between each section is described below. The image acquisition section 101 is connected to the alignment processing section 102. The alignment processing section 102 is connected to the reference image generation section 103. The reference image generation section 103 is connected to the interpolated image generation section 104. The interpolated image generation section 104 is connected to the reference band selection section 105. The reference band selection section 105 is connected to the reference image generation section 103.

The process performed by each section is described below.

The image acquisition section 101 acquires captured image data that has been captured using an image sensor 120 and corresponds to a plurality of frames that differ in capture time, the image sensor 120 including a color filter array in which a plurality of color filters that respectively correspond to a plurality of bands are placed in an array. The details of the image sensor 120 are described later.

The alignment processing section 102 performs an alignment process on the acquired captured image data that corresponds to the plurality of frames to generate integrated captured image data.

The reference image generation section 103 performs an interpolation process on image data that is included in the integrated captured image data and corresponds to a color filter among the plurality of color filters that corresponds to a reference band to generate a reference image.

The interpolated image generation section 104 performs an interpolation process on image data that is included in the integrated captured image data and corresponds to a color filter among the plurality of color filters that corresponds to a band among the plurality of bands that differs from the reference band based on the reference image to generate an interpolated image.

The reference band selection section 105 selects the reference band for generating the reference image from the plurality of bands using an output image in a preceding frame that is a frame that precedes a reference frame in which the output image is generated.

Note that the functions of the image acquisition section 101, the alignment processing section 102, the reference image generation section 103, the interpolated image generation section 104, and the reference band selection section 105 may be implemented by hardware such as a processor (e.g., CPU) or an ASIC (e.g., gate array), a program, or the like.

Figure 4:
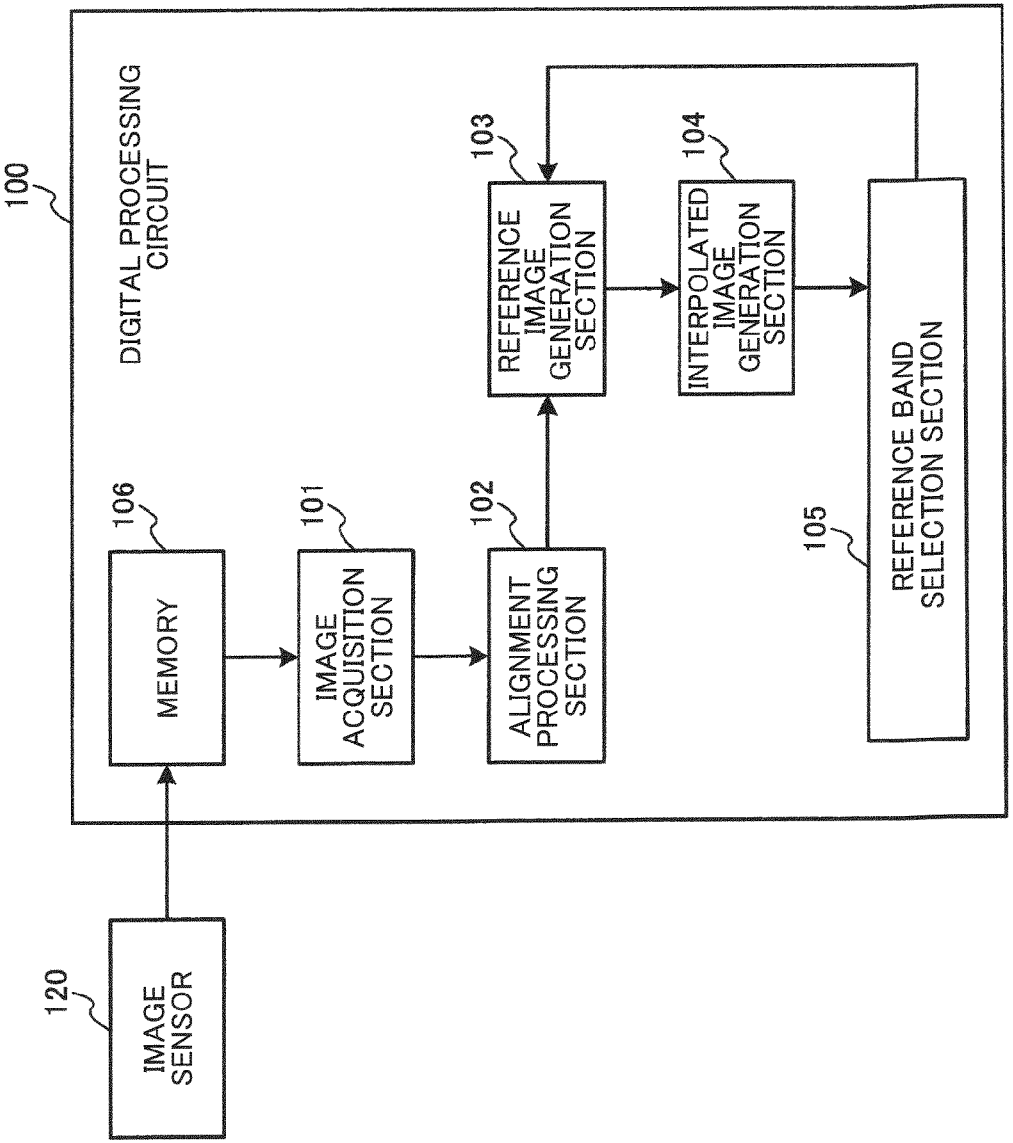
FIG. 4 illustrates a system configuration example of an imaging device according to the first embodiment.

FIG. 4 illustrates a configuration example of an imaging device according to the first embodiment that includes the system configuration of the image processing device illustrated in FIG. 3. The imaging device includes a digital processing circuit 100 that implements the image processing device, and the image sensor 120.

Figure 5:
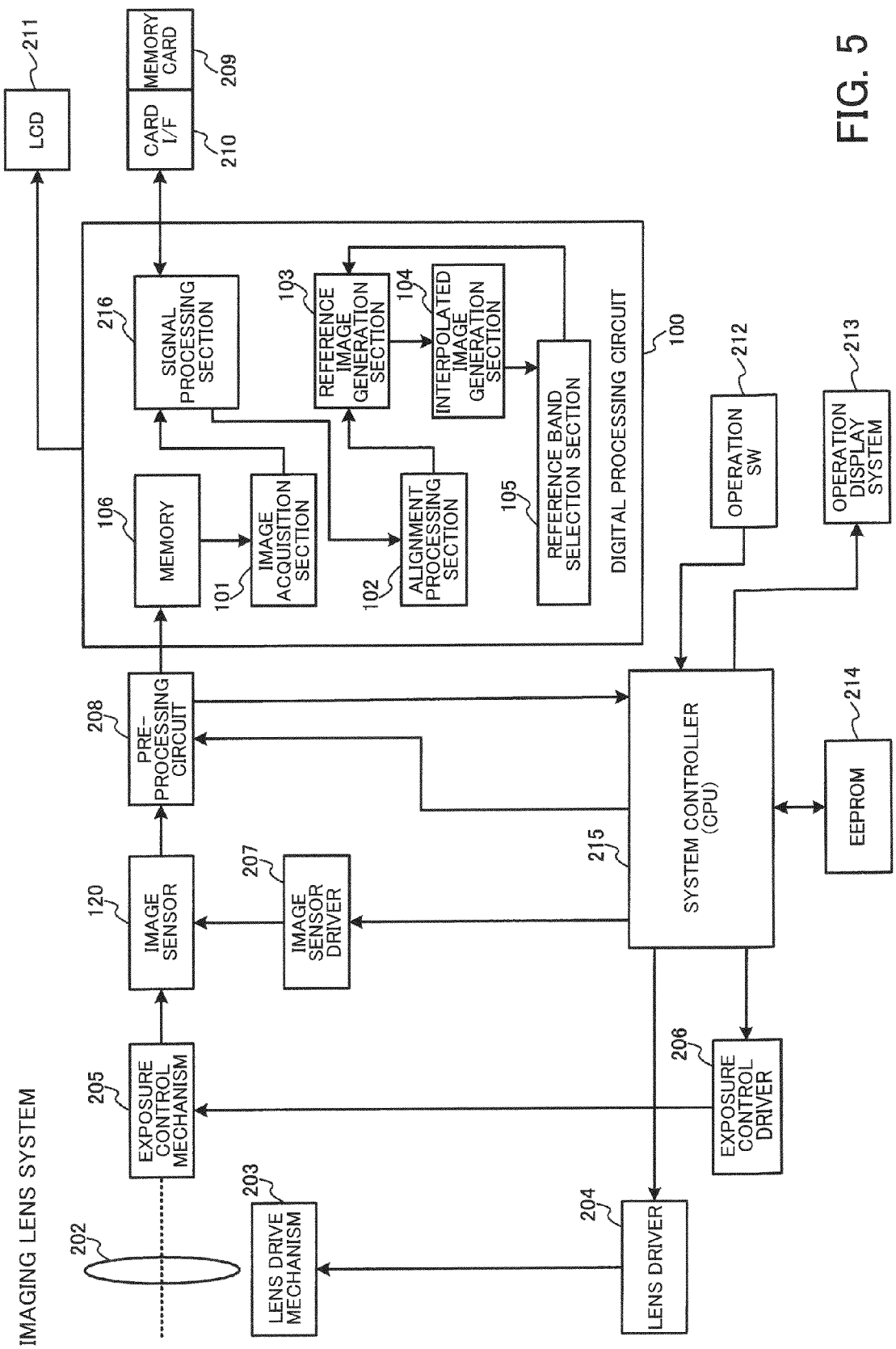
FIG. 5 illustrates a detailed system configuration example of the imaging device according to the first embodiment.

FIG. 5 illustrates the entire imaging device in detail. The imaging device illustrated in FIG. 5 includes an imaging lens system 202 that includes various lenses (imaging lenses), a lens drive mechanism 203 that drives the imaging lens system 202 forward and backward, and drives a zoom lens and a focus lens included in the imaging lens system 202, a lens driver 204 that controls the lens drive mechanism 203, an exposure control mechanism 205 that controls the aperture (and the shutter) of the imaging lens system 202, an exposure control driver 206 that controls the exposure control mechanism 205, the image sensor 120 that photoelectrically converts an object image, and includes three or more color filters that differ in spectral sensitivity characteristics, an image sensor driver 207 that drives the image sensor 120, a preprocessing circuit 208 that includes an analog amplifier, an A/D converter, and the like, the digital processing circuit 100 that performs digital processing such as color signal processing for generating a recorded image and compression/decompression processing, a card interface 210 that functions as an interface with a memory card 209 (external recording device), an LCD image display system 211, an operation switch system 212 that includes a shutter release switch, a setting button, and the like, an operation display system 213 that displays an operation state, a mode state, and the like, a nonvolatile memory 214 in which setting information and the like are set (stored), and a system controller 215 that controls each section.

The imaging device illustrated in FIG. 5 stores RAW data that has been acquired from the image sensor 120 and corresponds to a plurality of frames in the memory 106, and the alignment processing section 102 performs the alignment process on the RAW data that corresponds to the plurality of frames.

The reference image generation section 103 performs the interpolation process on the data that has been generated by the alignment processing section 102 and corresponds to the plurality of frames with respect to the band (reference band) that has been selected by the reference band selection section 105 and has the highest correlation with the color characteristics of the object to generate the reference image. Note that the band that is stored in advance in the reference image generation section 103 is used as the reference band for the first frame for which the reference band has not been selected by the reference band selection section 105.

The interpolated image generation section 104 performs the interpolation process on the data that has been generated by the alignment processing section 102 and corresponds to the plurality of frames with respect to the band that is not used by the reference image generation section 103 using the reference image that has been generated by the reference image generation section 103 to generate the interpolated image.

The reference band selection section 105 determines the band that has the highest correlation with the color characteristics of the object using the interpolated image that has been generated by the interpolated image generation section 104, and transmits information about the reference band for the next frame to the reference image generation section 103.

The imaging device illustrated in FIG. 5 is configured so that the system controller 215 controls each section. Specifically, the system controller 215 controls the lens driver 204, the exposure control driver 206, and the image sensor driver 207 to drive the image sensor 120 to implement exposure (charge storage) and a signal readout process. The system controller 215 performs an A/D conversion process on the read signal through the preprocessing circuit 208, transmits the resulting signal to the digital processing circuit 100, causes a signal processing section 216 included in the digital processing circuit 100 to perform signal processing, and records the resulting signal in the memory card 209 through the card interface 210.

Figure 6:
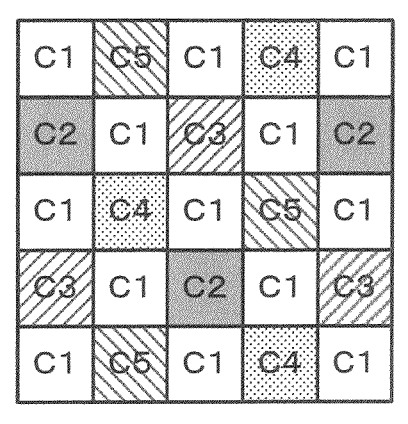

FIG. 6 illustrates a color filter array (hereinafter may be referred to as "CFA") that has spectral sensitivity characteristics obtained by five bands as an example of a CFA that is placed on the pixels included in the image sensor 120 and has spectral sensitivity characteristics obtained by three or more bands. As illustrated in FIG. 6, C1 pixels have a sampling density higher than the sampling density of pixels that respectively correspond to other bands, and are provided in a staggered pattern in the same manner as the G pixels included in a 3-band Bayer array.

Note that the configuration of the image processing device and the configuration of the imaging device that includes the image processing device are not limited to those illustrated in FIGS. 3, 4, and 5. Various modifications may be made, such as omitting some of the elements illustrated in FIGS. 3, 4, and 5, or adding other elements. Some or all of the functions of the image processing device or the imaging device according to the first embodiment may be implemented by a server that is connected to the image processing device or the imaging device through a communication channel.

2.2 Details of Process

The flow of the process according to the first embodiment is described below with reference to FIG. 7 (flowchart).

A RAW data readout frame for reading the RAW data stored in the memory 106 from the image sensor 120 is set (S401), and whether or not the RAW data corresponding to a plurality of frames is stored in the memory 106 is determined (S402). Note that the term "RAW data" used herein refers to the captured image data prior to image processing.

When only the RAW data corresponding to one frame is stored in the memory 106, the RAW data corresponding to one frame is read from the memory 106 (S403).

When the RAW data corresponding to a plurality of frames is stored in the memory 106, the RAW data corresponding to the plurality of frames is read from the memory 106 (S404), and the alignment process is performed (S405).

A band that is used as the reference band is selected after the step S403 or the step S405 (S406). When the reference band determination result has been obtained in a step S409 (described later), a band that is used as the reference band is selected based on the reference band determination result. The C1 band that is stored in advance in the reference image generation section 103 as a band having the highest sampling density within the CFA is selected as the reference band for the first frame for which the reference band determination result has not been obtained in the step S409.

The interpolation process is performed on the RAW data that has been acquired in the step S403 or the step S404 with respect to the reference band selected in the step S406 to generate the reference image (S407).

The interpolation process is performed on the RAW data that has been acquired in the step S403 or the step S404 with respect to each band that is not selected as the reference band using the reference image obtained in the step S407 to generate the interpolated image (S408).

The band that has the highest correlation with the color characteristics of the object is determined using the generated interpolated image, and the reference band determination result is used for the next frame (S409).

Figure 7:
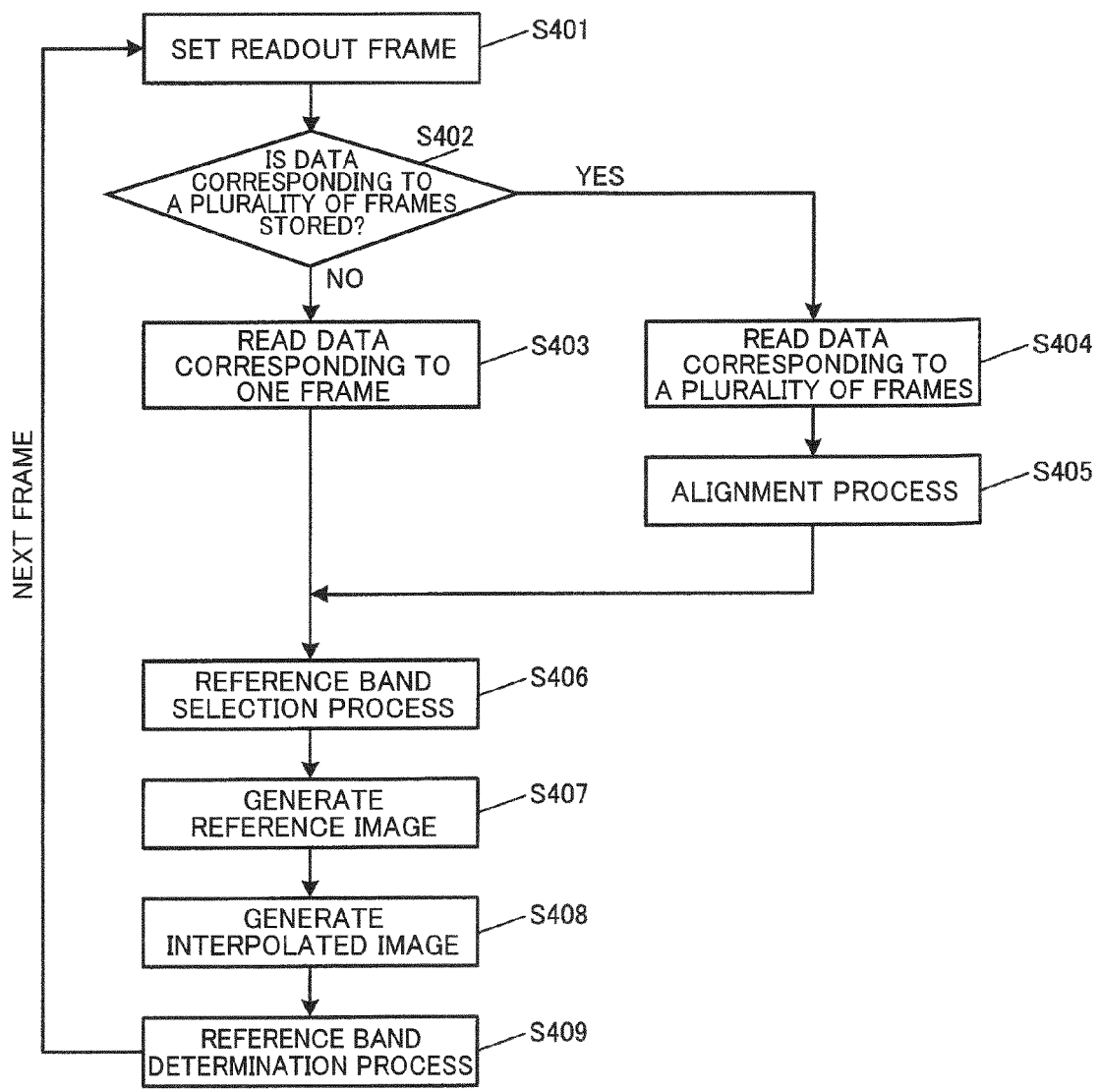
FIG. 7 is a flowchart illustrating the flow of a process according to the first embodiment.
Figure 8:
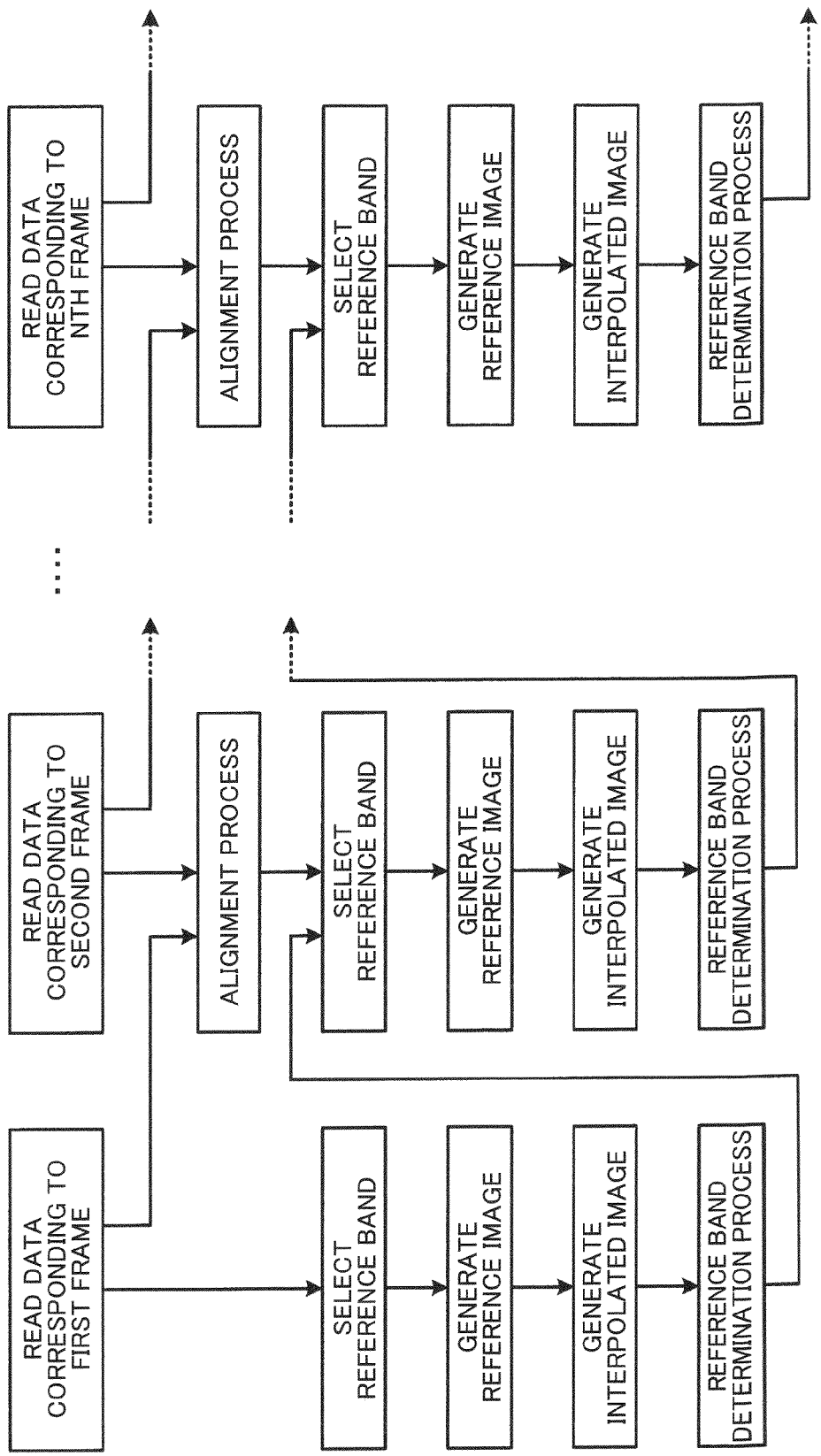
FIG. 8 is a flowchart illustrating the flow of a process according to the first embodiment in time series.

FIG. 8 is a flowchart illustrating the flow of the process illustrated in FIG. 7 in time series.

The process performed corresponding to the first frame differs from the process performed corresponding to the second or subsequent frame since only the RAW data corresponding to one frame is stored in the memory 106, and the reference band determination result has not been obtained. The process performed corresponding to the second or subsequent frame uses the RAW data corresponding to a plurality of frames, and sets the band that has been determined to have the highest correlation with the color characteristics of the object using the generated interpolated image to be the reference band.

Each step is described in detail below. The alignment process performed in the step S405 is described below.

When performing the alignment process on two images, the amount of position shift (motion vector) between the images is calculated, and each pixel of the alignment target image is aligned with respect to each pixel of the reference image while shifting each pixel of the alignment target image so as to cancel the amount of position shift.

In the first embodiment, a block matching process is used to calculate the amount of position shift. The block matching process divides a reference frame image into blocks having a given size (e.g., 8 pixels×8 lines), calculates the amount of position shift from each pixel of the preceding frame image within a given range on a block basis, and searches a block in which the sum absolute difference (SAD) is a minimum. When the pixel position and the pixel level of a matching reference block area I are respectively referred to as p∈I and Lp, and the pixel position and the pixel level of the target block area I' are respectively referred to as q∈I' and Lq, the SAD is defined by the following expression (1). It is determined that the correlation is high when the SAD is small. Note that p and q are a quantity having a two-dimensional value, I and I' are a two-dimensional area, p∈I represents that the coordinate value p is included in the area I, and q∈I' represents that the coordinate value q is included in the area I'.

$$SAD(I, I') = \sum_{p \in I, q \in I'} \|Lp - Lq\| \quad (1)$$

The position shift of the preceding frame image is corrected based on the amount of position shift calculated by the block matching process.

Although an example in which the amount of position shift is calculated by the block matching process to implement the alignment process has been described above, another method may also be used. For example, it is also possible to use a phase only correlation technique or a feature point matching technique (e.g., SIFT). The evaluation value is not limited to the SAD. For example, it is also possible to use the sum of squared difference (SSD) given by the following expression (2), or a normalized cross-correlation (NCC) value. The process may be performed with sub-pixel accuracy.

$$SSD(I, I') = \sum_{p \in I, q \in I'} (Lp - Lq)^2 \quad (2)$$

The reference image generation process performed in the step S407 is described below.

In the first embodiment, the reference image generation process is performed using a Gaussian interpolation (GI) method. The GI method estimates the pixel value as the weighted average of local information around the pixel value estimation target pixel position. The estimated pixel value $S^{GI}(x_p)$ with respect to the pixel position $x_p$ is given by the following expression (3).

$$S^{GI}(x_p) = \frac{1}{\omega^{GI}(x_p)} \sum_{x_i \in N_{xp}} k(x_i - x_p) M(x_i) S(x_i) \quad (3)$$

Note that $N_{xp}$ is a set (pixel position set) of the pixel positions of the pixels around the pixel position $x_p$, $x_i$ is an arbitrary pixel position within the pixel position set $N_{xp}$, $S(x_i)$ is the pixel value at the pixel position $x_i$, $M(x_i)$ is a binary mask at the pixel position $x_i$, $k(x_i-x_p)$ is a weight based on the distance from the pixel position $x_p$, and $\omega^{GI}(x_p)$ is a normalization coefficient (weight sum). The binary mask $M(x_i)$ is 1 at a position at which a pixel value is present, and is 0 at a position at which a pixel value is absent.

FIG. 6 illustrates an example in which the RAW data corresponding to one frame is stored in the memory 106, and the C1 band is selected as the reference band to generate the reference image. In the captured image PIM9 illustrated in FIG. 6, the information about the C1 band acquired from the RAW data is placed in a staggered pattern, and the above interpolation process is performed on the data to generate the reference image RIM9 in which the information about the C1 band is present at each pixel position.

Figure 9:
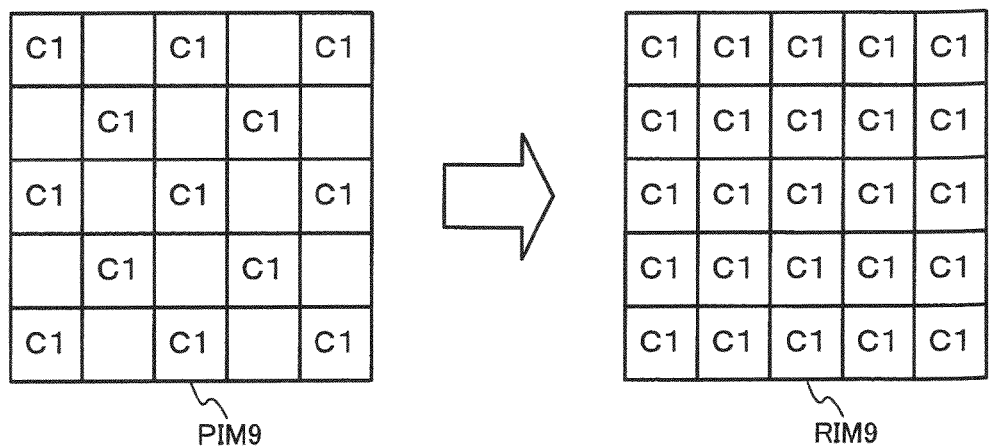
FIG. 9 is a view illustrating a reference image generation process that uses one frame.
Figure 10:
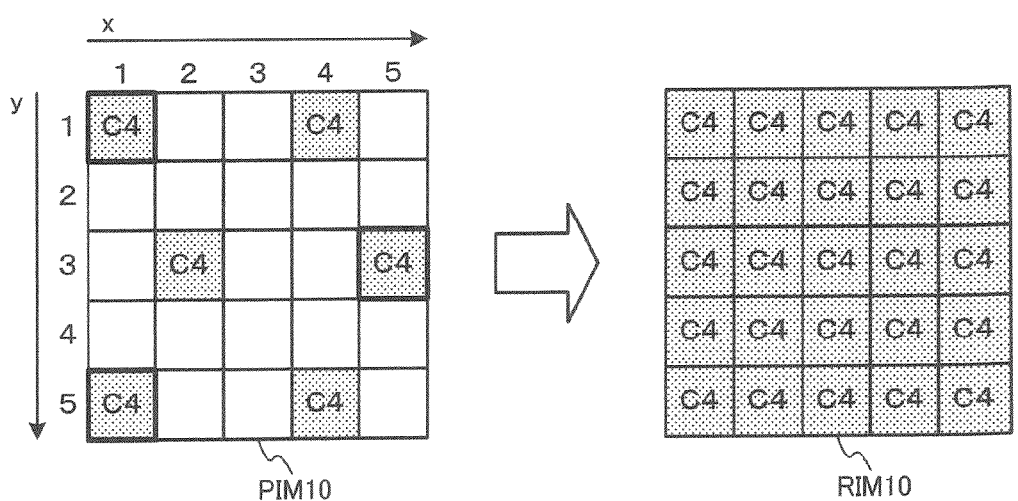
FIG. 10 is a view illustrating a reference image generation process that uses two frames.

FIG. 10 illustrates an example in which the RAW data corresponding to two frames is stored in the memory 106, and the C4 band is used as the reference band. The image PIM10 illustrated in FIG. 10 is an image obtained by performing the alignment process on two captured images (two frames) for generating the reference image. The C4 band that is used as the reference band is shown within the image PIM10 illustrated in FIG. 10. In FIG. 6, the information about the C4 pixel is obtained at only the pixel positions (4,1), (2,3), and (4,5). The C4 pixel sampling density is increased (i.e., the pixels enclosed by the bold line have been added) by performing the alignment process on the captured image in the second frame that differs in capture time and capture position from the captured image in the first frame. The pixel position at which the C4 pixel is added by utilizing the RAW data corresponding to two frames differs corresponding to the results of the alignment process performed in the step S405. In this case, the reference image RIM10 in which the information about the C4 band is present at each pixel position is generated by performing the interpolation process in the same manner as in FIG. 9.

The interpolated image generation process performed in the step S408 is described below.

In the first embodiment, the interpolation process is performed on the image that is not subjected to the interpolation process using a guided filter (guided image filter) to generate the output image. When using the guided filter, the output image is represented by linear transformation of the reference image. The coefficients $a_k$ and $b_k$ are calculated using the least-square method so as to minimize the cost function $E(a_k, b_k)$ of the local area k around the pixel value estimation target pixel position (see the following expression (4)).

$$E(a_k, b_k) = \frac{1}{\omega_k} \sum_i M_i \{(a_k I_i + b_k - p_i)^2 + \varepsilon a_k^2\} \quad (4)$$

Note that i is the pixel number, k is the local area number, $I_i$ is the pixel value of the pixel i included in the reference image, $p_i$ is the pixel value (signal component) of the pixel i included in the image that is not subjected to the interpolation process, $\omega_k$ is the number of pixels that have a signal component and are included within the local area k of the image that is not subjected to the interpolation process, $\varepsilon$ is a given smoothing parameter, and $M_i$ is a binary mask at the pixel i. The binary mask $M_i$ is set to 1 for a pixel that is included in the image that is not subjected to the interpolation process and has a signal component, and is set to 0 for a pixel that is included in the image that is not subjected to the interpolation process and does not have a signal component. $a_k$ and $b_k$ are coefficient parameters that must be calculated for use in the following expression (5). An appropriate initial value is used as the coefficient parameters $a_k$ and $b_k$ when starting calculations.

When the coefficients $a_k$ and $b_k$ have been calculated for each local area, the output pixel value $q_i$ is calculated for each interpolation target pixel that does not have a signal component using the expression (5).

$$q_i = \frac{1}{|\omega|} \sum_{k:\, i \in \omega_k} (a_k I_i + b_k) \quad (5)$$

Note that $|\omega|$ in the expression (5) is the total number of pixels within the local area (i.e., the number of local areas).

In the first embodiment, the interpolated image obtained in the step S407 is used as the reference image, and each band differing from the band included in the reference image is used as the interpolation target image. It is possible to generate the interpolated image that includes the high-frequency component of the reference image by performing the interpolation process that utilizes the reference image.

Although an example in which the reference image is necessarily an image obtained in the step S407 has been described above, it is also possible to perform the interpolation process while sequentially changing the image used as the reference image by utilizing the correlation of the spectral sensitivity characteristics. For example, when using a CFA having the spectral sensitivity characteristics illustrated in FIG. 11, a C4 band interpolated image may be generated using the C5 band as the reference image when the C5 band is selected as the reference band, and a C1 band interpolated image may be generated using the C4 band interpolated image as the reference image. Specifically, the interpolation process is performed using the image of the band having the adjacent spectral sensitivity characteristics as the reference image. This makes it possible to generate an interpolated image that includes the high-frequency component even when performing the interpolation process on the band that has a low correlation with the reference band.

The reference band determination process performed in the step S409 is described below.

When determining the reference band, the high-frequency component is detected from each interpolated image (band image) obtained in the step S408, and the band that includes the largest amount of high-frequency component is determined to be the band that has the highest correlation with the color characteristics of the object.

The high-frequency component is detected using a high-pass filter. The high-pass filter is a Laplacian filter, and the sum of the absolute values obtained by Laplacian calculations is calculated to be the evaluation value. This process is performed on a band basis to select the band having the largest evaluation value.

It is possible to detect the high-frequency component with high accuracy as compared with the case of selecting the reference band from the RAW data by selecting the reference band from the interpolated image.

Although an example in which the reference band is determined by detecting the high-frequency component has been described above, the configuration is not limited thereto. For example, the reference band may be determined using the sum or the average value of the brightness values (evaluation value) corresponding to each interpolated image (band image) (simple process). Since it is considered that the image of the band that has a high correlation with the color characteristics of the object has a large brightness value, it is effective to determine the reference band using the brightness value. It is possible to select the reference band with high accuracy as compared with the case of selecting the reference band from the RAW data by selecting the reference band from the interpolated image, even when determining the reference band using the brightness value.

The above process makes it possible to generate an interpolated image that includes a large amount of high-frequency component and has high resolution regardless of the color characteristics of the object. According to the first embodiment, even a band having low sampling density within the CFA can be used as data having high sampling density by utilizing the RAW data corresponding to a plurality of frames. This makes it possible to implement the interpolation process using the reference image that includes the high-frequency component, and generate a highly accurate interpolated image. It is also possible to select a band having a high correlation with the color characteristics of the object with high accuracy by performing the reference band determination process using the interpolated image.

Figures 11, 12:
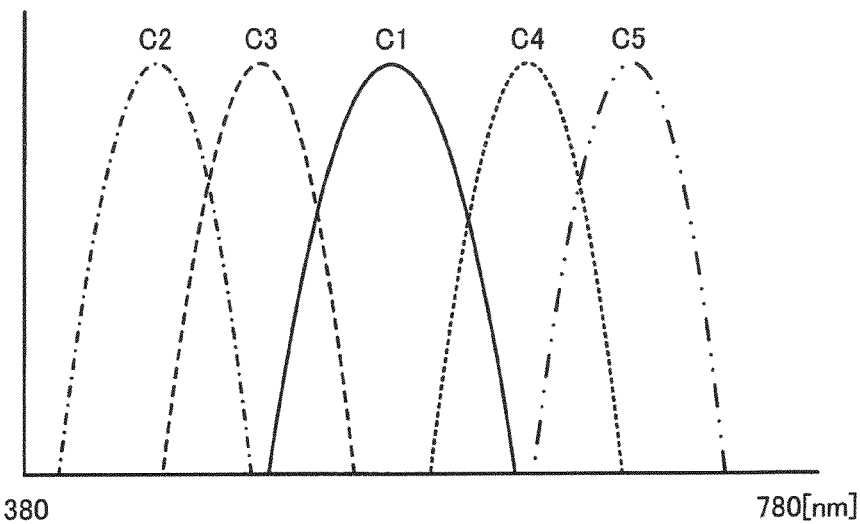
FIG. 11 is a view illustrating spectral sensitivity characteristics.
FIG. 12 is a view illustrating a 3-band color filter array.

Although the first embodiment has been described above using the CFA having the spectral sensitivity characteristics obtained by five bands (FIG. 6) as an example of the CFA having the spectral sensitivity characteristics obtained by three or more bands, it is also possible to implement the above process using the 3-band Bayer array illustrated in FIG. 12.

Although the first embodiment has been described above taking an example in which one band is used as the reference band over the entire image, the image may be divided into a plurality of local areas, and a different band may be selected as the reference band on a local area basis to implement the above process. When a different reference band is used on a local area basis, it is possible to generate an interpolated image that includes a large amount of high-frequency component and has high resolution even when a plurality of objects that differ in color characteristics are present within one scene. According to the first embodiment, since the reference band is determined from the preceding-frame interpolation results, it is possible to increase the sampling density of each band within the local area as compared with the case of selecting the reference band from the RAW data, and more accurately determine the reference band on a local area basis. This effect becomes more significant as the number of bands of the image sensor 120 increases.

Although an example in which the process is performed using two frames has been described above, the process may be performed using three or more frames.

2.3 Modification

A modification is described below in which the interpolated image generation process is changed to use only one frame when it has been determined that a plurality of frames do not have a correlation as a result of the alignment process.

Figure 13:
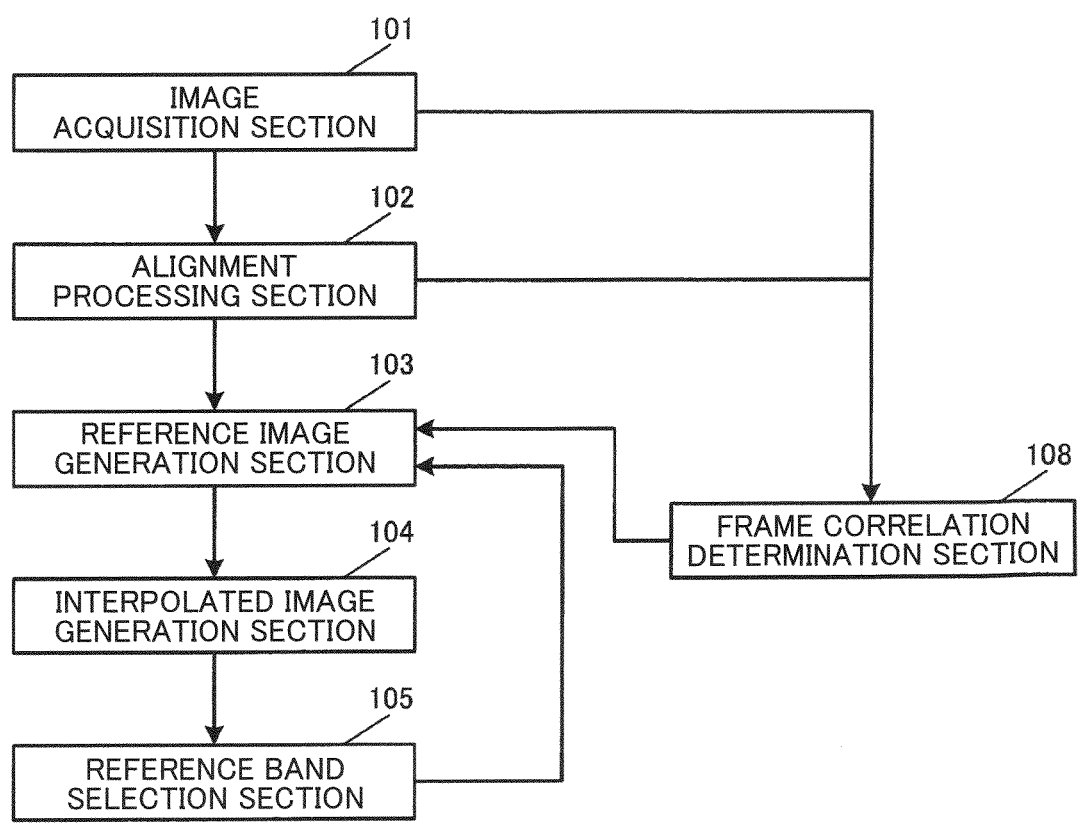
FIG. 13 illustrates another system configuration example of an image processing device according to the first embodiment.

The configuration according to the modification is basically the same as the configuration according to the first embodiment, but differs from the configuration according to the first embodiment as to the process performed by the digital processing circuit 100. More specifically, the digital processing circuit 100 according to the modification further includes a frame correlation determination section 108 (see FIG. 13). Note that the function of the frame correlation determination section 108 may be implemented by hardware such as a processor (e.g., CPU) or an ASIC (e.g., gate array), a program, or the like.

Figure 14:
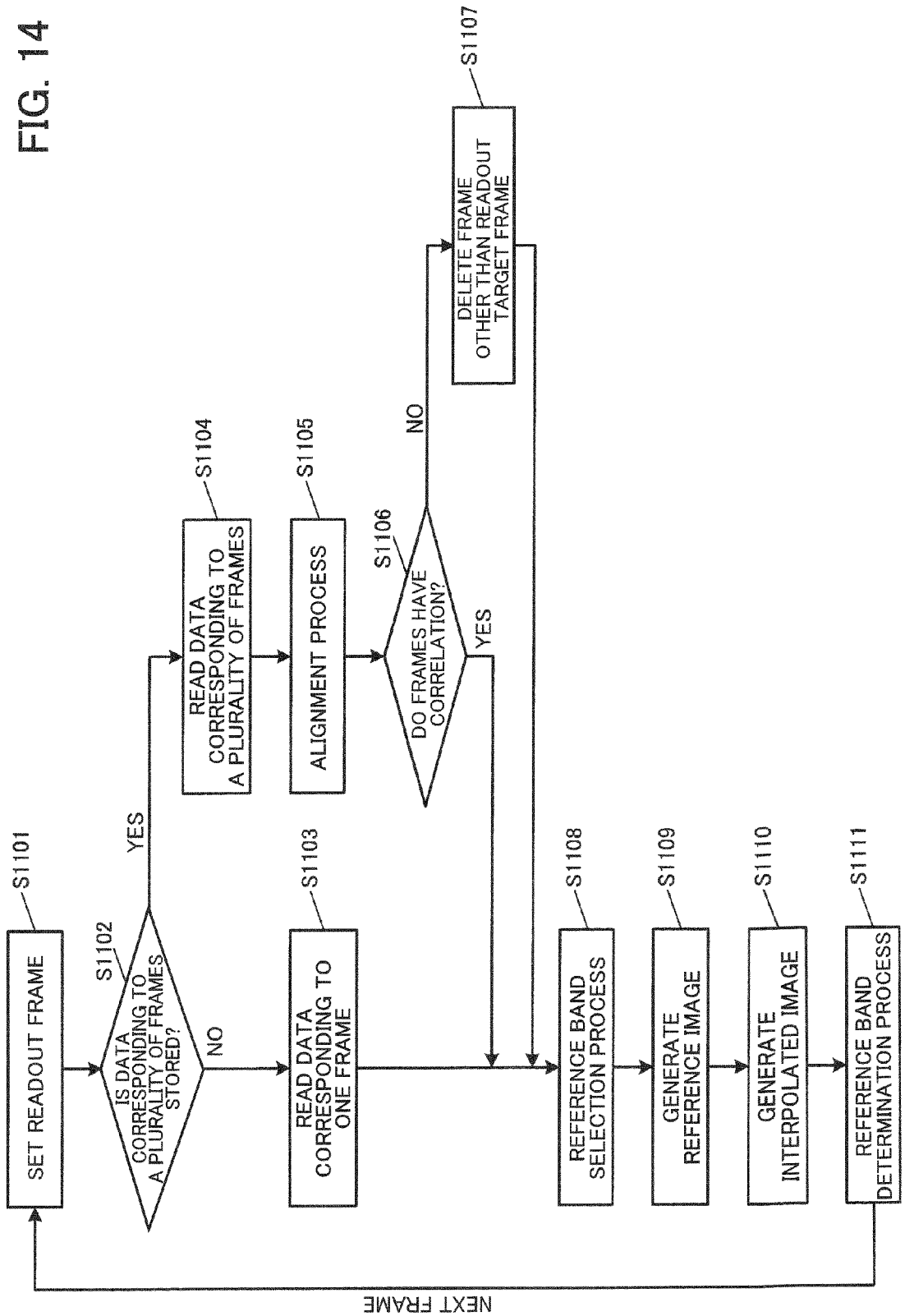
FIG. 14 is a flowchart illustrating the flow of a process according to the first embodiment.

FIG. 14 is a flowchart illustrating the flow of the interpolated image generation process according to the modification. Note that description of the same steps as those described above in connection with the first embodiment (see FIG. 7) is omitted.

When it has been determined that the RAW data corresponding to a plurality of frames is stored in the memory 106 (S1102), the RAW data corresponding to the plurality of frames is read from the memory 106 (S1104), the alignment process is performed (S1105), and whether or not the plurality of frames have a correlation is determined (S1106).

It is determined that the plurality of frames do not have a correlation when the amount of position shift determined by the alignment process performed in the step S1105 is equal to or larger than a given threshold value θ1, or the evaluation value (SAD) is equal to or larger than a given threshold value θ2.

When it has been determined that the plurality of frames do not have a correlation, the information about the frame other than the readout target frame is deleted (S1107), and the next step is performed in a state in which the RAW data corresponding to at least one frame is stored.

When it has been determined that the plurality of frames have a correlation, the reference band selection process is performed (S1108) without performing the frame deletion process (S1107).

The above process makes it possible to suppress occurrence of an artifact due to a decrease in accuracy of the alignment process even when a significant change in scene has occurred, and a plurality of frames do not have a correlation.

3. Second Embodiment
3.1 System Configuration Example

The second embodiment illustrates an example in which the frame count used is changed based on the determination result of the reference band selection section.

Figure 15:
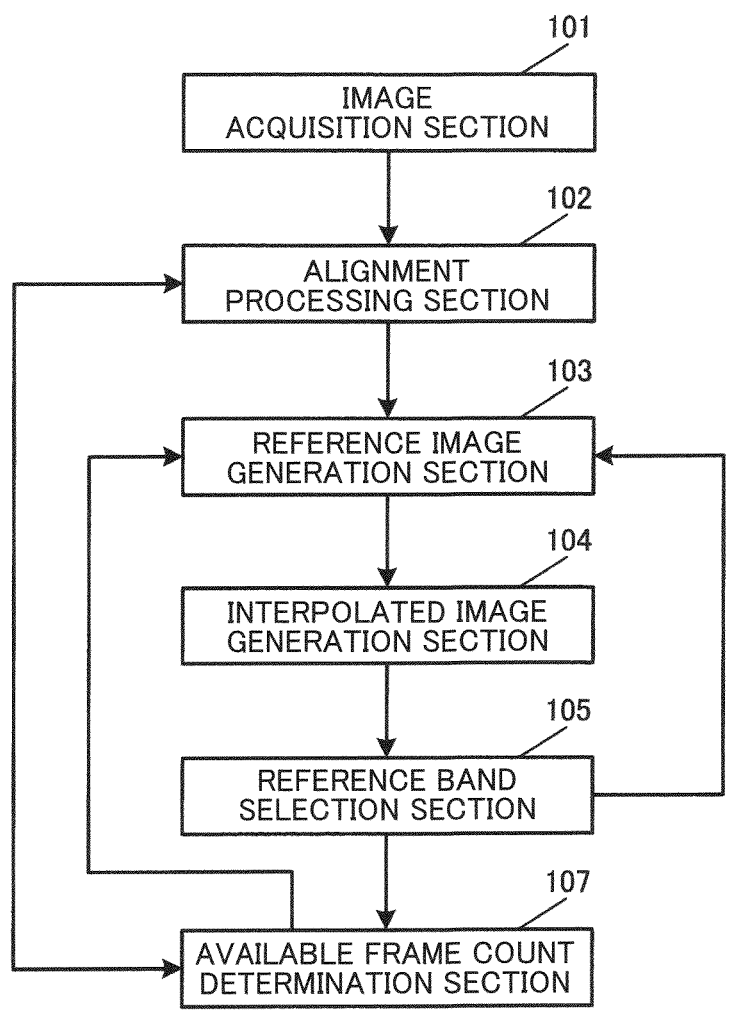
FIG. 15 illustrates a system configuration example of an image processing device according to a second embodiment.

The configuration according to the second embodiment is basically the same as the configuration according to the first embodiment (see FIG. 3), but differs from the configuration according to the first embodiment as to the process performed by the digital processing circuit 100. More specifically, the digital processing circuit 100 according to the second embodiment further includes an available frame count determination section 107 (see FIG. 15). Note that the function of the available frame count determination section 107 may be implemented by hardware such as a processor (e.g., CPU) or an ASIC (e.g., gate array), a program, or the like.

3.2 Details of Process

Figure 16:
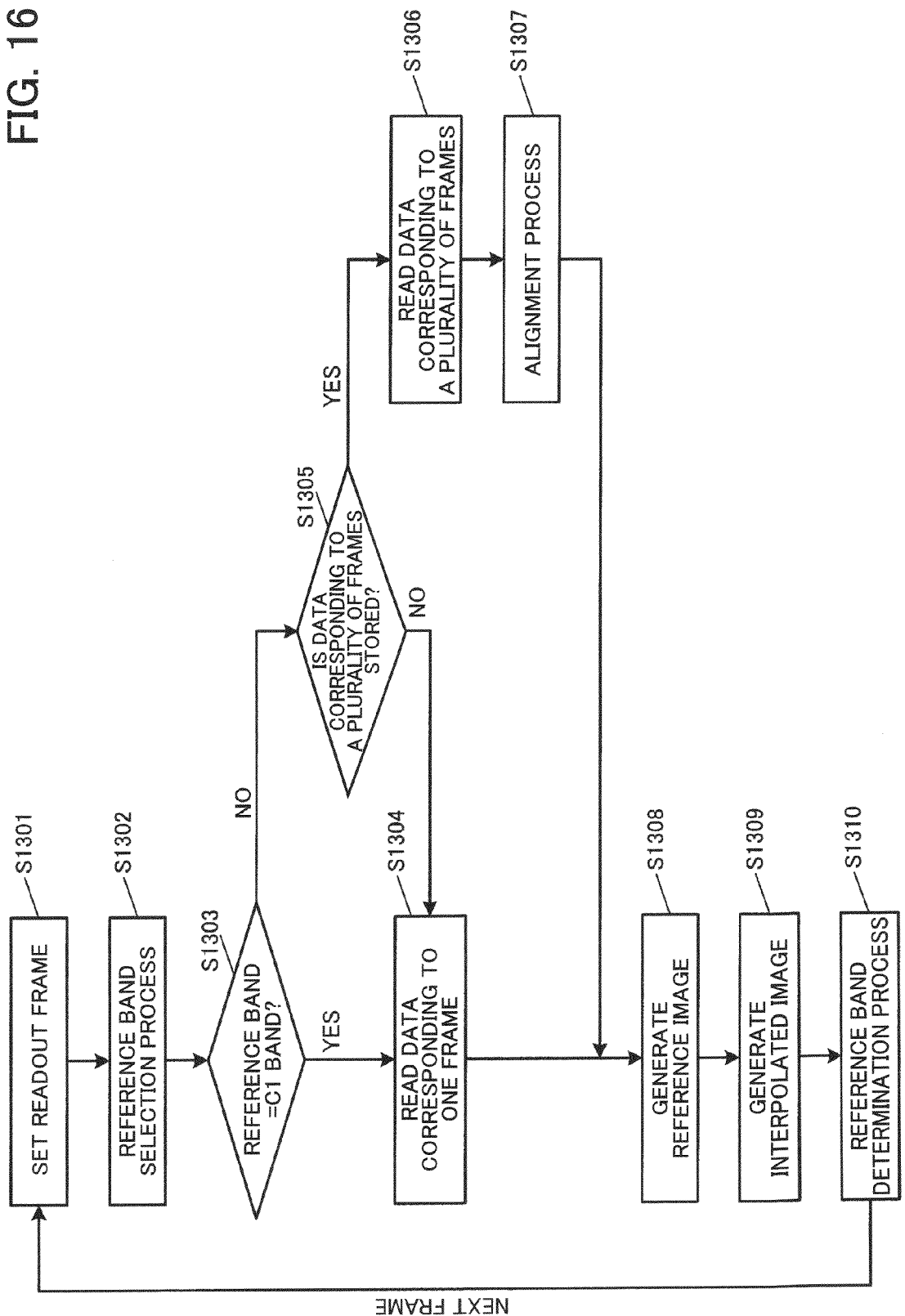
FIG. 16 is a flowchart illustrating the flow of a process according to the second embodiment.

FIG. 16 is a flowchart illustrating the flow of the interpolated image generation process according to the second embodiment. Note that description of the same steps as those described above in connection with the first embodiment (see FIG. 7) is omitted.

When the result of the reference band determination process performed in a step S1310 has not been obtained, or when the result of the reference band determination process performed in the step S1310 is the C1 band (S1303), the RAW data corresponding to one frame is read from the memory 106 (S1304). Since the sampling density is high when the reference band is the C1 band even when using only the RAW data corresponding to one frame, it is possible to generate an interpolated image that includes a large amount of high-frequency component and has high resolution without using the RAW data corresponding to a plurality of frames.

When the reference band is a band other than the C1 band, whether or not the RAW data corresponding to a plurality of frames is stored in the memory 106 is determined in the same manner as in the first embodiment (S1305), and the RAW data corresponding to the frames based on the determination result is read from the memory 106 (S1306). Since the sampling density is low when using only the RAW data corresponding to one frame when the reference band is a band other than the C1 band, and it is difficult to accurately reproduce the high-frequency component, the RAW data corresponding to a plurality of frames is used.

The above process makes it possible to read the RAW data corresponding to the frames necessary for generating the interpolated image corresponding to the type of reference band determined from the preceding-frame interpolated image. Since the reference image can be generated within one frame using the C1 band when the object is a normal object, it is possible to simplify the alignment process, and save space in the memory.

3.3 Modification

A modification is described below in which the frame count used by the reference image generation section 103 and the frame count used by the interpolated image generation section 104 are set independently.

The configuration according to the modification is basically the same as the configuration according to the second embodiment (see FIG. 15), but differs from the configuration according to the second embodiment as to the process performed by the digital processing circuit 100. More specifically, the process performed by the available frame count determination section 107 and the process performed by the interpolated image generation section 104 differ from those described above in connection with the second embodiment.

Figure 17:
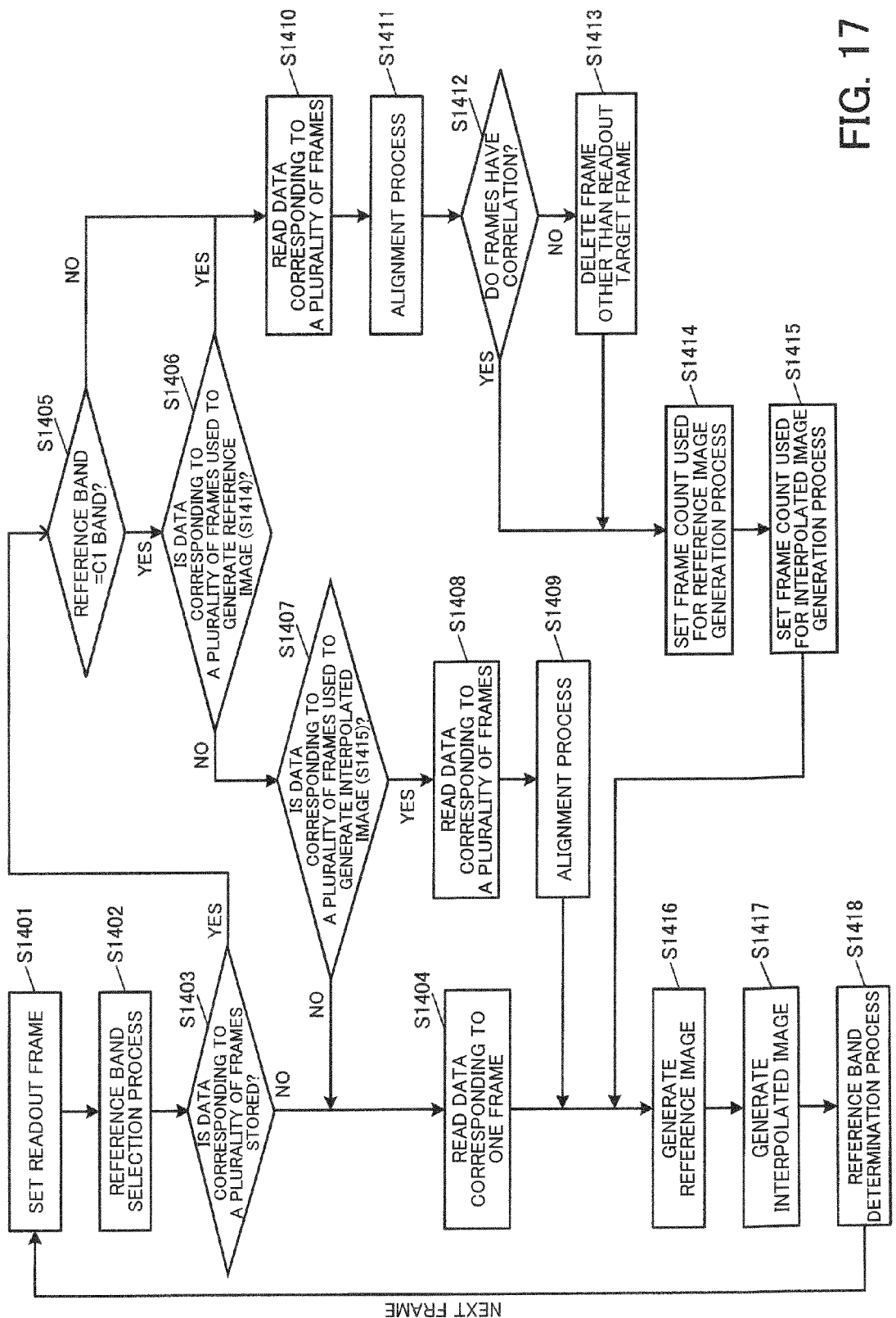
FIG. 17 is a flowchart illustrating the flow of a process according to the second embodiment.

FIG. 17 is a flowchart illustrating the flow of the interpolated image generation process according to the modification. Note that description of the same steps as those described above in connection with the first embodiment (see FIG. 7) is omitted.

Whether or not the RAW data corresponding to a plurality of frames is stored in the memory 106 is determined (S1403). When it has been determined that the RAW data corresponding to a plurality of frames is stored in the memory 106, whether or not the reference band is the C1 band is determined (S1405).

When the reference band is the C1 band, whether or not to use the data corresponding to a plurality of frames for generating the reference image is determined (S1406). In this case, information stored in the available frame count determination section 107 in advance is read from the available frame count determination section 107. When the reference band is the C1 band, it is possible to generate a highly accurate image even when the reference image is generated using only the data corresponding to one frame in the same manner as in the second embodiment. However, since a more accurate reference image can be generated by utilizing a plurality of frames, it is effective to use the data corresponding to a plurality of frames even when the reference band is the C1 band.

When it has been determined in the step S1406 to use only the data corresponding to one frame for generating the reference image, whether or not to use the data corresponding to a plurality of frames for generating the interpolated image is determined (S1407). In the S1407, whether or not to use the data corresponding to a plurality of frames is determined based on the frame count used to generate the interpolated image in the preceding frame, and the results of the alignment process performed on the preceding frame.

For example, when only one frame was used to generate the interpolated image in the preceding frame, only one frame is used for the attention frame. In this case, the input data corresponding to one frame is read from the memory 106 (S1404), and steps S1416 to S1418 are performed. When a plurality of frames were used to generate the interpolated image in the preceding frame, whether or not the frames have a correlation is determined from the information during the alignment process in the preceding frame. When it has been determined that the frames do not have a correlation, one frame is used for the attention frame (S1404).

When it has been determined that the frames have a correlation, a plurality of frames are used for the attention frame to generate the interpolated image. When it has been determined in the step S1407 to use a plurality of frames for generating the interpolated image, the RAW data corresponding to a plurality of frames is read from the memory 106 (S1408), the alignment process is performed (S1409), and the steps S1416 to S1418 are performed.

When it has been determined in the step S1405 that the reference band is the C1 band, or when it has been determined in the step S1406 to use the data corresponding to a plurality of frames for generating the reference image, the RAW data corresponding to a plurality of frames is read from the memory 106 (S1410), and the alignment process is performed (S1411).

Whether or not the plurality of frames read from the memory 106 have a correlation is determined (S1412). When it has been determined that the plurality of frames have a correlation, the next step is performed. When it has been determined that the plurality of frames do not have a correlation, the frame that does not have a correlation with the remaining frame is deleted (S1413), and the next step is performed.

When it has been determined in the step S1412 that the plurality of frames have a correlation, it is determined to use a plurality of frames for the reference image generation process. When it has been determined in the step S1412 that the plurality of frames do not have a correlation, it is determined to use one frame for the reference image generation process (S1414).

When it has been determined in the step S1412 that the plurality of frames have a correlation, the information stored in the available frame count determination section 107 in advance is read from the available frame count determination section 107, and it is determined to use one frame or a plurality of frames for the interpolated image generation process (S1415). It is possible to generate a highly accurate image by utilizing a plurality of frames. Note that it may be determined to use one frame for the interpolated image generation process taking account of the processing time, the memory capacity, and the like. When it has been determined in the step S1412 that the plurality of frames do not have a correlation, it is determined to use one frame for the interpolated image generation process. The steps S1416 to S1418 are then performed.

As described above, when the reference band is the C1 band, it is possible to generate a highly accurate image even when the data corresponding to one frame is used for the reference image generation process and the interpolated image generation process. Note that it is possible to generate a more accurate image when the data corresponding to a plurality of frames can be used for the interpolated image generation process. When the C1 band data corresponding to a plurality of frames can be used for the reference image generation process, it is possible to generate a highly accurate image even when the data corresponding to one frame is used for the interpolated image generation process, for example. Note that it is possible to generate a more accurate image when the data corresponding to a plurality of frames is used for the interpolated image generation process.

When the reference band is a band other than the C1 band, it is possible to generate a highly accurate image when the data corresponding to a plurality of frames is used for the reference image generation process. When a plurality of frames do not have a correlation, it is possible to prevent a deterioration in image quality due to failure in the alignment process by performing the interpolated image generation process using only one frame. When a plurality of frames can be used for the reference image generation process, it is possible to generate a highly accurate image by utilizing the data corresponding to a plurality of frames for the interpolated image generation process. Even when only the data corresponding to one frame is used for the interpolated image generation process, it is possible to generate a highly accurate image as compared with the case of generating the reference image and the interpolated image using only the data corresponding to one frame. It is also possible to delete the data corresponding to the preceding frame after generating the reference image, and save space in the memory.

The above process makes it possible to generate a highly accurate interpolated image corresponding to the type of reference band determined from the interpolated image in the preceding frame, and the frame count used.

4. Method

The method according to the embodiments of the invention is described below.

The image processing device according to the embodiments of the invention includes the image acquisition section 101 that acquires captured image data that has been captured using the image sensor 120 and corresponds to a plurality of frames that differ in capture time, the image sensor 120 including a color filter array in which a plurality of color filters that respectively correspond to a plurality of bands are placed in an array, the alignment processing section 102 that performs the alignment process on the acquired captured image data that corresponds to the plurality of frames to generate the integrated captured image data, the reference band selection section 105 that selects the reference band for generating the reference image from the plurality of bands using the output image in the preceding frame that precedes the reference frame in which the output image is generated, the reference image generation section 103 that performs the interpolation process on the image data that is included in the integrated captured image data and corresponds to a color filter among the plurality of color filters that corresponds to the reference band to generate the reference image, and the interpolated image generation section 104 that performs the interpolation process on the image data that is included in the integrated captured image data and corresponds to a color filter among the plurality of color filters that corresponds to a band among the plurality of bands that differs from the reference band based on the reference image to generate the interpolated image.

According to the above configuration, the reference band for generating the reference image is selected from the plurality of bands using the output image in the preceding frame that precedes the reference frame in which the output image is generated. The method according to the embodiments of the invention differs from the method disclosed in JP-A-2009-94577 as to this feature.

The term "reference band" used herein refers to a band used to generate the reference image among the plurality of bands that respectively correspond to the color filters placed in the color filter array included in the image sensor 120.

The alignment process is performed on the acquired captured image data that corresponds to the plurality of frames to generate the integrated captured image data.

The term "integrated captured image data" used herein refers to image data that is generated as a result of performing the alignment process on the captured image data that corresponds to the plurality of frames. For example, the image PIM10 illustrated in FIG. 10 is the integrated captured image data that has been acquired as a result of performing the alignment process on the captured image data that corresponds to two frames.

The interpolation process is performed on the image data that is included in the integrated captured image data and corresponds to the color filter that corresponds to the reference band to generate the reference image.

In the example illustrated in FIG. 10, the image data that is included in the integrated captured image data and corresponds to the color filter that corresponds to the reference band, corresponds to the pixel value of the C4 band included in the image PIM10 since the reference band is the C4 band. Specifically, since the pixels other than the pixels at which the pixel value of the C4 band has been calculated (see the white pixels included in the image PIM10 illustrated in FIG. 10) do not have the pixel value of the C4 band, the pixel value of the C4 band is interpolated into these pixels to generate the image RIM10 (i.e., reference image) illustrated in FIG. 10.

The term "reference image" used herein refers to an image in which only the pixel value of the reference band has been calculated corresponding to each pixel. For example, the image RIM illustrated in FIG. 1, the image RIMS illustrated in FIG. 9, and the image RIM 10 illustrated in FIG. 10 correspond to the reference image.

The interpolation process is performed on the image data that is included in the integrated captured image data and corresponds to the color filter that corresponds to a band that differs from the reference band, based on the reference image to generate the interpolated image.

The term "interpolated image" used herein refers to an image in which only the pixel value of one band among the plurality of bands that respectively correspond to the color filters placed in the color filter array that is other than the reference band, has been calculated corresponding to each pixel. For example, the image IIM1 illustrated in FIG. 1 is a C2 band interpolated image, and the image IIM2 illustrated in FIG. 1 is a C3 band interpolated image.

It is possible to use a band having low sampling density as information having high sampling density while maintaining the frame rate, and generate an image that includes a large amount of high-frequency component and has high resolution regardless of the color characteristics of the object, by performing the interpolation process using the information corresponding to a plurality of frames.

The image processing device may include the available frame count determination section 107 that determines a reference image generation frame count that is used by the reference image generation section 103 based on the type of the reference band selected by the reference band selection section 105.

This makes it possible to read frames in a number necessary for generating the reference image corresponding to the type of the reference band. For example, when using the color filter array illustrated in FIG. 6, the C1 band having the highest sampling density is used as the reference band when the object is a normal object. As a result, the reference image can be generated within one frame, and it is possible to simplify the alignment process, and save space in the memory.

More specifically, when determining the reference image generation frame count, the frame count used when generating the reference image may be decreased when the reference band is a band having a sampling density higher than those of the remaining bands as compared with the case where the reference band is a band having low sampling density.

Specifically, the image acquisition section 101 may acquire the captured image data that has been captured using the image sensor 120 and corresponds to the plurality of frames, the image sensor 120 including the color filter array that includes a first color filter, and a second color filter that has a sampling density lower than that of the first color filter. The available frame count determination section 107 may determine a first frame count to be the reference image generation frame count when the reference band is a band that corresponds to the first color filter, and may determine a second frame count that is larger than the first frame count to be the reference image generation frame count when the reference band is a band that corresponds to the second color filter.

For example, when using the color filter array illustrated in FIG. 6, the C1 band corresponds to the first color filter, and a band among the C2 to C5 bands corresponds to the second color filter.

This makes it possible to determine the reference image generation frame count corresponding to the sampling density of the reference band, for example.

The first color filter may be a color filter that is placed in the color filter array at the intersections of an odd-numbered row and an odd-numbered column and the intersections of an even-numbered row and an even-numbered column, or the intersections of an odd-numbered row and an even-numbered column and the intersections of an even-numbered row and an odd-numbered column. The second color filter may be a color filter that is placed in the color filter array at positions differing from those of the first color filter.

In this case, the first color filter is placed in a staggered pattern (see the C1 band pixels illustrated in FIG. 6), and the second color filter is placed at the positions other than the C1 band pixels (see the C2 to C5 band pixels illustrated in FIG. 6).

According to this configuration, it is possible to generate a highly accurate reference image using only the data corresponding to one frame when the reference band is a band that is placed in a staggered pattern, and generate a highly accurate reference image using the data corresponding to a plurality of frames when the reference band is a band that is not placed in a staggered pattern, for example.

The image processing device may include the available frame count determination section 107 that determines an interpolated image generation frame count that is used by the interpolated image generation section 104 based on the type of the reference band selected by the reference band selection section 105.

This makes it possible to read frames in a number necessary for generating the interpolated image corresponding to the type of the reference band.

Since the interpolated image is an image that corresponds to a band other than the reference band (see above), the interpolated image is an image that corresponds to a band having low sampling density when the reference band is a band having high sampling density. Therefore, when determining the interpolated image generation frame count, it is desirable to increase the frame count used when generating the interpolated image (differing from the case of generating the reference image) when the reference band is a band having a sampling density higher than those of the remaining bands as compared with the case where the reference band is a band having low sampling density.

Specifically, the image acquisition section 101 may acquire the captured image data that has been captured using the image sensor 120 and corresponds to the plurality of frames, the image sensor 120 including the color filter array that includes a first color filter, and a second color filter that has a sampling density lower than that of the first color filter.

The available frame count determination section 107 may determine a third frame count to be the interpolated image generation frame count when the reference band is a band that corresponds to the first color filter, and may determine a fourth frame count that is smaller than the third frame count to be the interpolated image generation frame count when the reference band is a band that corresponds to the second color filter.

Note that the third frame count may be the same as the first frame count, and the fourth frame count may be the same as the second frame count.

This makes it possible to determine the interpolated image generation frame count corresponding to the sampling density of the reference band, for example.

According to the above configuration, it is possible to generate the reference image using the data corresponding to one frame, and generate the interpolated image using the data corresponding to a plurality of frames when the reference band is a band that is placed in a staggered pattern, for example. Therefore, it is possible to generate a highly accurate interpolated image.

It is possible to generate the reference image using the data corresponding to a plurality of frames, and generate the interpolated image using the data corresponding to one frame when the reference band is a band that is not placed in a staggered pattern, for example. Therefore, it is possible to generate a highly accurate interpolated image as compared with the case of generating both the reference image and the interpolated image using the data corresponding to one frame.

The image processing device may further include the frame correlation determination section 108 that determines an inter-frame correlation of the captured image data. The available frame count determination section 107 may determine the available frame count based on the determination result of the frame correlation determination section 108.

This makes it possible to suppress occurrence of an artifact due to a decrease in accuracy of the alignment process even when a significant change in scene has occurred, and a plurality of frames do not have a correlation, for example.

The reference band selection section 105 may select a band among the plurality of bands that has the highest correlation with the color characteristics of the object in the output image in the preceding frame as the reference band.

This makes it possible to perform the interpolated image generation process and the like based on the color characteristics of the object, for example.

It is necessary to use a band that includes a high-frequency component as the reference band.

Therefore, the reference band selection section 105 may select the reference band by evaluating at least one of the high-frequency component and the brightness of the output image in the preceding frame.

This makes it possible to determine the reference band with high accuracy, for example. It is also possible to detect the high-frequency component with higher accuracy as compared with the case of evaluating the high-frequency component using the RAW data by evaluating the high-frequency component using the output image in the preceding frame.

The reference band selection section 105 may select the reference band on a basis of local areas, the local areas being defined by dividing the image into a plurality of areas.

It is possible to generate an interpolated image that includes a large amount of high-frequency component and has high resolution, even when a plurality of objects that differ in color characteristics are present within one scene, by utilizing a different reference band on a local area basis, for example.

The image acquisition section 101 may acquire the captured image data that has been captured using the image sensor 120 and corresponds to the plurality of frames, the image sensor 120 including the color filter array that includes a first color filter, and a second color filter that has a sampling density lower than that of the first color filter, the first color filter being placed at the intersections of an odd-numbered row and an odd-numbered column and the intersections of an even-numbered row and an even-numbered column, or the intersections of an odd-numbered row and an even-numbered column and the intersections of an even-numbered row and an odd-numbered column, and the second color filter being placed at positions differing from those of the first color filter. The reference image generation section 103 may generate the reference image by performing the interpolation process on the image data that corresponds to the first color filter when the reference band has not been selected by the reference band selection section 105.

According to this configuration, even when the information about the reference band has not been obtained from the output image in the preceding frame, it is possible to generate a highly accurate interpolated image by utilizing the band having the highest sampling density as the reference band as compared with the case of utilizing another band as the reference band, for example.

The image acquisition section 101 may acquire the captured image data that has been captured using the image sensor 120 and corresponds to the plurality of frames, the image sensor 120 including the color filter array in which a plurality of color filters respectively corresponding to four or more bands that differ in spectral sensitivity characteristics are placed.

This makes it possible to generate an image that includes a large amount of high-frequency component and has high resolution regardless of the color characteristics of the object, even when generating the interpolated image using a multi-band image sensor, for example.

Note that part or the majority of the processes performed by the image processing device, the imaging device, and the like according to the embodiments of the invention may be implemented by a program. In this case, the image processing device, the imaging device, and the like according to the embodiments of the invention are implemented by causing a processor (e.g., CPU) to execute the program. Specifically, a program stored in an information storage device is read, and executed by a processor (e.g., CPU). The information storage device (computer-readable device) stores a program, data, and the like. The function of the information storage device may be implemented by an optical disk (e.g., DVD or CD), a hard disk drive (HDD), a memory (e.g., memory card or ROM), or the like. The processor (e.g., CPU) performs various processes according to the embodiments of the invention based on the program (data) stored in the information storage device. Specifically, a program that causes a computer (i.e., a device that includes an operation section, a processing section, a storage section, and an output section) to function as each section according to the embodiments of the invention (i.e., a program that causes a computer to execute the process implemented by each section) is stored in the information storage device.

The image processing device, the imaging device, and the like according to the embodiments of the invention may include a processor and a memory. The processor may be a central processing unit (CPU), for example. Note that the processor is not limited to a CPU. Various types of processors such as a graphics processing unit (GPU) and a digital signal processor (DSP) may also be used. The processor may be a hardware circuit that includes an application specific integrated circuit (ASIC). The memory stores a computer-readable instruction. Each section of the image processing device, the imaging device, and the like according to the embodiments of the invention is implemented by causing the processor to execute the instruction. The memory may be a semiconductor memory (e.g., static random access memory (SRAM) or dynamic random access memory (DRAM)), a register, a hard disk, or the like. The instruction may be an instruction included in an instruction set of a program, or may be an instruction that causes a hardware circuit of the processor to operate.

Although only some embodiments of the invention have been described in detail above, those skilled in the art will readily appreciate that many modifications are possible in the embodiments without materially departing from the novel teachings and advantages of the invention. Accordingly, all such modifications are intended to be included within scope of this invention. Any term cited with a different term having a broader meaning or the same meaning at least once in the specification and the drawings can be replaced by the different term in any place in the specification and the drawings. The configuration and the operation of the image processing device, the imaging device, and the information storage device are not limited to those described in connection with the first embodiment or the second embodiment. Various modifications and variations may be made of the above embodiments.

What is claimed is:

1. An image processing device comprising:
    an image acquisition section that acquires captured image data that has been captured using an image sensor and corresponds to a plurality of frames that differ in capture time, the image sensor including a color filter array in which a plurality of color filters that respectively correspond to a plurality of bands are placed in an array;
    an alignment processing section that performs an alignment process on the acquired captured image data that corresponds to the plurality of frames to generate integrated captured image data;
    a reference band selection section that selects a reference band for generating a reference image from the plurality of bands using an output image in a preceding frame that precedes a reference frame in which the output image is generated;
    a reference image generation section that performs an interpolation process on image data that is included in the integrated captured image data and corresponds to a color filter among the plurality of color filters that corresponds to the reference band to generate the reference image; and
    an interpolated image generation section that performs an interpolation process on image data that is included in the integrated captured image data and corresponds to a color filter among the plurality of color filters that corresponds to a band among the plurality of bands that differs from the reference band based on the reference image to generate an interpolated image.

2. The image processing device as defined in claim 1, further comprising:
    an available frame count determination section that determines a reference image generation frame count that is used by the reference image generation section based on a type of the reference band selected by the reference band selection section.

3. The image processing device as defined in claim 2, wherein:
    the image acquisition section acquires the captured image data that has been captured using the image sensor and corresponds to the plurality of frames, the image sensor includes the color filter array that includes a first color filter, and a second color filter that has a sampling density lower than that of the first color filter, and
    the available frame count determination section determines a first frame count to be the reference image generation frame count when the reference band is a band that corresponds to the first color filter, and determines a second frame count that is larger than the first frame count to be the reference image generation frame count when the reference band is a band that corresponds to the second color filter.

4. The image processing device as defined in claim 3, wherein:
    the first color filter is a color filter that is placed in the color filter array at intersections of an odd-numbered row and an odd-numbered column and intersections of an even-numbered row and an even-numbered column, or intersections of an odd-numbered row and an even-numbered column and intersections of an even-numbered row and an odd-numbered column, and
    the second color filter is a color filter that is placed in the color filter array at positions differing from those of the first color filter.

5. The image processing device as defined in claim 1, further comprising:
    an available frame count determination section that determines an interpolated image generation frame count that is used by the interpolated image generation section based on a type of the reference band selected by the reference band selection section.

6. The image processing device as defined in claim 5, wherein:
    the image acquisition section acquires the captured image data that has been captured using the image sensor and corresponds to the plurality of frames, the image sensor includes the color filter array that includes a first color filter, and a second color filter that has a sampling density lower than that of the first color filter, and
    the available frame count determination section determines a third frame count to be the interpolated image generation frame count when the reference band is a band that corresponds to the first color filter, and determines a fourth frame count that is smaller than the third frame count to be the interpolated image generation frame count when the reference band is a band that corresponds to the second color filter.

7. The image processing device as defined in claim 2, further comprising:
    a frame correlation determination section that determines an inter-frame correlation of the captured image data,
    wherein the available frame count determination section determines an available frame count based on a determination result of the frame correlation determination section.

8. The image processing device as defined in claim 1, wherein the reference band selection section selects a band among the plurality of bands that has a highest correlation with color characteristics of an object in the output image in the preceding frame as the reference band.

9. The image processing device as defined in claim 1, wherein the reference band selection section selects the reference band by evaluating at least one of a high-frequency component and brightness of the output image in the preceding frame.

10. The image processing device as defined in claim 1, wherein the reference band selection section selects the reference band on a basis of local areas, the local areas being defined by dividing an image into a plurality of areas.

11. The image processing device as defined in claim 1, wherein:
the image acquisition section acquires the captured image data that has been captured using the image sensor and corresponds to the plurality of frames, the image sensor includes the color filter array that includes a first color filter, and a second color filter that has a sampling density lower than that of the first color filter, the first color filter is placed at intersections of an odd-numbered row and an odd-numbered column and intersections of an even-numbered row and an even-numbered column, or intersections of an odd-numbered row and an even-numbered column and intersections of an even-numbered row and an odd-numbered column, and the second color filter is placed at positions differing from those of the first color filter, and
the reference image generation section generates the reference image by performing the interpolation process on image data that corresponds to the first color filter when the reference band has not been selected by the reference band selection section.

12. The image processing device as defined in claim 1, wherein the image acquisition section acquires the captured image data that has been captured using the image sensor and corresponds to the plurality of frames, the image sensor including the color filter array in which a plurality of color filters respectively corresponding to four or more bands that differ in spectral sensitivity characteristics are placed.

13. An imaging device comprising the image processing device as defined in claim 1.

14. An image processing method comprising:
acquiring captured image data that has been captured using an image sensor and corresponds to a plurality of frames that differ in capture time, the image sensor including a color filter array in which a plurality of color filters that respectively correspond to a plurality of bands are placed in an array;
performing an alignment process on the acquired captured image data that corresponds to the plurality of frames to generate integrated captured image data;
selecting a reference band for generating a reference image from the plurality of bands using an output image in a preceding frame that precedes a reference frame in which the output image is generated;
performing an interpolation process on image data that is included in the integrated captured image data and corresponds to a color filter among the plurality of color filters that corresponds to the reference band to generate the reference image; and
performing an interpolation process on image data that is included in the integrated captured image data and corresponds to a color filter among the plurality of color filters that corresponds to a band among the plurality of bands that differs from the reference band based on the reference image to generate an interpolated image.

15. A non-transitory computer-readable storage device with an executable program stored thereon, wherein the program instructs a computer to perform functions comprising:
acquiring captured image data that has been captured using an image sensor and corresponds to a plurality of frames that differ in capture time, the image sensor including a color filter array in which a plurality of color filters that respectively correspond to a plurality of bands are placed in an array;
performing an alignment process on the acquired captured image data that corresponds to the plurality of frames to generate integrated captured image data;
selecting a reference band for generating a reference image from the plurality of bands using an output image in a preceding frame that precedes a reference frame in which the output image is generated;
performing an interpolation process on image data that is included in the integrated captured image data and corresponds to a color filter among the plurality of color filters that corresponds to the reference band to generate the reference image; and
performing an interpolation process on image data that is included in the integrated captured image data and corresponds to a color filter among the plurality of color filters that corresponds to a band among the plurality of bands that differs from the reference band based on the reference image to generate an interpolated image.

* * * * *